(12) United States Patent
Olshansky

(10) Patent No.: US 11,423,071 B1
(45) Date of Patent: Aug. 23, 2022

(54) CANDIDATE DATA RANKING METHOD USING PREVIOUSLY SELECTED CANDIDATE DATA

(71) Applicant: On Time Staffing Inc., Golden Valley, MN (US)

(72) Inventor: Roman Olshansky, Golden Valley, MN (US)

(73) Assignee: On Time Staffing, Inc., Golden Valley, MN (US)

( * ) Notice: Subject to any disclaimer, the term of this patent is extended or adjusted under 35 U.S.C. 154(b) by 0 days.

(21) Appl. No.: 17/463,221

(22) Filed: Aug. 31, 2021

(51) Int. Cl.
    *G06F 16/33*     (2019.01)
    *G06F 16/335*     (2019.01)
    (Continued)

(52) U.S. Cl.
    CPC ........ *G06F 16/335* (2019.01); *G06F 16/3335* (2019.01); *G06F 16/387* (2019.01);
    (Continued)

(58) Field of Classification Search
    CPC .. G06F 16/335; G06F 16/3335; G06F 16/387; G06F 16/735; G06F 40/279; G10L 15/197; G10L 15/26; G10L 25/51
    See application file for complete search history.

(56) References Cited

U.S. PATENT DOCUMENTS

| | | |
|---|---|---|
| 1,173,785 A | 2/1916 | Deagan |
| 1,686,351 A | 10/1928 | Spitzglass |

(Continued)

FOREIGN PATENT DOCUMENTS

| | | |
|---|---|---|
| AU | 2002310201 | 3/2003 |
| AU | 2007249205 | 3/2013 |

(Continued)

OTHER PUBLICATIONS

"Air Canada Keeping Your Points Active Aeroplan," https://www.aircanada.com/us/en/aco/home/aeroplan/your-aeroplan/inactivity-policy.html, 6 pages.

(Continued)

*Primary Examiner* — Vincent F Boccio
*Assistant Examiner* — Andrew N Ho
(74) *Attorney, Agent, or Firm* — Pauly, DeVries Smith & Deffner LLC

(57) ABSTRACT

Various embodiments provide a method for sorting data. The method can include: receiving criteria data from a user regarding an open opportunity; receiving candidate data, storing candidate data in a candidate profile in a candidate database; evaluating the candidate data, wherein evaluating the candidate data comprises: comparing the audio data of the candidate to a database of successfully-selected candidates to determine an N-gram analysis result for the candidate data, wherein the N-gram analysis includes creating a textual transcript of the audio data for a portion audio data; removing stop words from the textual transcript; creating an N-gram data set based on the textual transcript with stop words removed; comparing the N-gram data set of the candidate data to an N-gram data set of the successfully-selected candidates; and sorting the candidate data within a plurality of other candidate data using the N-gram analysis result.

20 Claims, 23 Drawing Sheets

(51) Int. Cl.
*G10L 15/197* (2013.01)
*G10L 15/26* (2006.01)
*G06F 40/279* (2020.01)
*G06F 16/387* (2019.01)
*G06F 16/735* (2019.01)
*G10L 25/51* (2013.01)

(52) U.S. Cl.
CPC .......... *G06F 16/735* (2019.01); *G06F 40/279* (2020.01); *G10L 15/197* (2013.01); *G10L 15/26* (2013.01); *G10L 25/51* (2013.01)

(56) References Cited

U.S. PATENT DOCUMENTS

| | | | |
|---|---|---|---|
| 3,152,622 | A | 10/1964 | Rothermel |
| 3,764,135 | A | 10/1973 | Madison |
| 5,109,281 | A | 4/1992 | Kobori et al. |
| 5,410,344 | A | 4/1995 | Graves et al. |
| 5,835,667 | A | 11/1998 | Wactlar et al. |
| 5,867,209 | A | 2/1999 | Irie et al. |
| 5,884,004 | A | 3/1999 | Sato et al. |
| 5,886,967 | A | 3/1999 | Aramaki |
| 5,897,220 | A | 4/1999 | Huang et al. |
| 5,906,372 | A | 5/1999 | Recard |
| 5,937,138 | A | 8/1999 | Fukuda et al. |
| 5,949,792 | A | 9/1999 | Yasuda et al. |
| 6,128,414 | A | 10/2000 | Liu |
| 6,229,904 | B1 | 5/2001 | Huang et al. |
| 6,289,165 | B1 | 9/2001 | Abecassis |
| 6,484,266 | B2 | 11/2002 | Kashiwagi et al. |
| 6,502,199 | B2 | 12/2002 | Kashiwagi et al. |
| 6,504,990 | B1 | 1/2003 | Abecassis |
| RE37,994 | E | 2/2003 | Fukuda et al. |
| 6,600,874 | B1 | 7/2003 | Fujita et al. |
| 6,618,723 | B1 | 9/2003 | Smith |
| 6,981,000 | B2 | 12/2005 | Park et al. |
| 7,095,329 | B2 | 8/2006 | Saubolle |
| 7,146,627 | B1 | 12/2006 | Ismail et al. |
| 7,293,275 | B1 | 11/2007 | Krieger et al. |
| 7,313,539 | B1 | 12/2007 | Pappas et al. |
| 7,336,890 | B2 | 2/2008 | Lu et al. |
| 7,499,918 | B2 | 3/2009 | Ogikubo |
| 7,606,444 | B1 | 10/2009 | Erol et al. |
| 7,650,286 | B1 | 1/2010 | Obeid |
| 7,702,542 | B2 | 4/2010 | Aslanian |
| 7,725,812 | B1 | 5/2010 | Balkus et al. |
| 7,797,402 | B2 | 9/2010 | Roos |
| 7,810,117 | B2 | 10/2010 | Karnalkar et al. |
| 7,865,424 | B2 | 1/2011 | Pappas et al. |
| 7,895,620 | B2 | 2/2011 | Haberman et al. |
| 7,904,490 | B2 | 3/2011 | Ogikubo |
| 7,962,375 | B2 | 6/2011 | Pappas et al. |
| 7,974,443 | B2 | 7/2011 | Kipman et al. |
| 7,991,635 | B2 | 8/2011 | Hartmann |
| 7,996,292 | B2 | 8/2011 | Pappas et al. |
| 8,032,447 | B2 | 10/2011 | Pappas et al. |
| 8,046,814 | B1 | 10/2011 | Badenell |
| 8,099,415 | B2 | 1/2012 | Luo et al. |
| 8,111,326 | B1 | 2/2012 | Talwar |
| 8,169,548 | B2 | 5/2012 | Ryckman |
| 8,185,543 | B1 | 5/2012 | Choudhry et al. |
| 8,229,841 | B2 | 7/2012 | Pappas et al. |
| 8,238,718 | B2 | 8/2012 | Toyama et al. |
| 8,241,628 | B2 | 8/2012 | Diefenbach-Streiber et al. |
| 8,266,068 | B1 | 9/2012 | Foss et al. |
| 8,300,785 | B2 | 10/2012 | White |
| 8,301,550 | B2 | 10/2012 | Pappas et al. |
| 8,301,790 | B2 | 10/2012 | Morrison et al. |
| 8,326,133 | B2 | 12/2012 | Lemmers |
| 8,326,853 | B2 | 12/2012 | Richard et al. |
| 8,331,457 | B2 | 12/2012 | Mizuno et al. |
| 8,331,760 | B2 | 12/2012 | Butcher |
| 8,339,500 | B2 | 12/2012 | Hattori et al. |
| 8,358,346 | B2 | 1/2013 | Hikita et al. |
| 8,387,094 | B1 | 2/2013 | Ho et al. |
| 8,505,054 | B1 | 8/2013 | Kirley |
| 8,508,572 | B2 | 8/2013 | Ryckman et al. |
| 8,543,450 | B2 | 9/2013 | Pappas et al. |
| 8,560,482 | B2 | 10/2013 | Miranda et al. |
| 8,566,880 | B2 | 10/2013 | Dunker et al. |
| 8,600,211 | B2 | 12/2013 | Nagano et al. |
| 8,611,422 | B1 | 12/2013 | Yagnik et al. |
| 8,620,771 | B2 | 12/2013 | Pappas et al. |
| 8,633,964 | B1 | 1/2014 | Zhu |
| 8,650,114 | B2 | 2/2014 | Pappas et al. |
| 8,751,231 | B1 | 6/2014 | Larsen et al. |
| 8,774,604 | B2 | 7/2014 | Torii et al. |
| 8,792,780 | B2 | 7/2014 | Hattori |
| 8,824,863 | B2 | 9/2014 | Kitamura et al. |
| 8,854,457 | B2 | 10/2014 | De Vleeschouwer et al. |
| 8,856,000 | B1 | 10/2014 | Larsen et al. |
| 8,902,282 | B1 | 12/2014 | Zhu |
| 8,909,542 | B2 | 12/2014 | Montero et al. |
| 8,913,103 | B1 | 12/2014 | Sargin et al. |
| 8,918,532 | B2 | 12/2014 | Lueth et al. |
| 8,930,260 | B2 | 1/2015 | Pappas et al. |
| 8,988,528 | B2 | 3/2015 | Hikita |
| 9,009,045 | B1 | 4/2015 | Larsen et al. |
| 9,015,746 | B2 | 4/2015 | Holmdahl et al. |
| 9,026,471 | B2 | 5/2015 | Pappas et al. |
| 9,026,472 | B2 | 5/2015 | Pappas et al. |
| 9,047,634 | B2 | 6/2015 | Pappas et al. |
| 9,064,258 | B2 | 6/2015 | Pappas et al. |
| 9,070,150 | B2 | 6/2015 | Pappas et al. |
| 9,092,813 | B2 | 7/2015 | Pappas et al. |
| 9,106,804 | B2 | 8/2015 | Roberts et al. |
| 9,111,579 | B2 | 8/2015 | Meaney et al. |
| 9,117,201 | B2 | 8/2015 | Kennell et al. |
| 9,129,640 | B2 | 9/2015 | Hamer |
| 9,135,674 | B1 | 9/2015 | Yagnik et al. |
| 9,223,781 | B2 | 12/2015 | Pearson et al. |
| 9,224,156 | B2 | 12/2015 | Moorer |
| 9,305,286 | B2 | 4/2016 | Larsen et al. |
| 9,305,287 | B2 | 4/2016 | Krishnamoorthy et al. |
| 9,355,151 | B1 | 5/2016 | Cranfill et al. |
| 9,378,486 | B2 | 6/2016 | Taylor et al. |
| 9,398,315 | B2 | 7/2016 | Oks et al. |
| 9,402,050 | B1 | 7/2016 | Recchia et al. |
| 9,437,247 | B2 | 9/2016 | Pendergast et al. |
| 9,438,934 | B1 | 9/2016 | Zhu |
| 9,443,556 | B2 | 9/2016 | Cordell et al. |
| 9,456,174 | B2 | 9/2016 | Boyle et al. |
| 9,462,301 | B2 | 10/2016 | Paśko |
| 9,501,663 | B1 | 11/2016 | Hopkins et al. |
| 9,501,944 | B2 | 11/2016 | Boneta et al. |
| 9,542,452 | B1 | 1/2017 | Ross et al. |
| 9,544,380 | B2 | 1/2017 | Deng et al. |
| 9,554,160 | B2 | 1/2017 | Han et al. |
| 9,570,107 | B2 | 2/2017 | Boiman et al. |
| 9,583,144 | B2 | 2/2017 | Ricciardi |
| 9,600,723 | B1 | 3/2017 | Pantofaru et al. |
| 9,607,655 | B2 | 3/2017 | Bloch et al. |
| 9,652,745 | B2 | 5/2017 | Taylor et al. |
| 9,653,115 | B2 | 5/2017 | Bloch et al. |
| 9,666,194 | B2 | 5/2017 | Ondeck et al. |
| 9,684,435 | B2 | 6/2017 | Carr et al. |
| 9,693,019 | B1 | 6/2017 | Fluhr et al. |
| 9,710,790 | B2 | 7/2017 | Taylor et al. |
| 9,723,223 | B1 | 8/2017 | Banta et al. |
| 9,747,573 | B2 | 8/2017 | Shaburov et al. |
| 9,792,955 | B2 | 10/2017 | Fleischhauer et al. |
| 9,805,767 | B1 | 10/2017 | Strickland |
| 9,823,809 | B2 | 11/2017 | Roos |
| 9,876,963 | B2 | 1/2018 | Nakamura et al. |
| 9,881,647 | B2 | 1/2018 | McCauley et al. |
| 9,936,185 | B2 | 4/2018 | Delvaux et al. |
| 9,940,508 | B2 | 4/2018 | Kaps et al. |
| 9,940,973 | B2 | 4/2018 | Roberts et al. |
| 9,979,921 | B2 | 5/2018 | Holmes |
| 10,008,239 | B2 | 6/2018 | Eris |
| 10,019,653 | B2 | 7/2018 | Wilf et al. |
| 10,021,377 | B2 | 7/2018 | Newton et al. |
| 10,108,932 | B2 | 10/2018 | Sung et al. |
| 10,115,038 | B2 | 10/2018 | Hazur et al. |

(56) References Cited

U.S. PATENT DOCUMENTS

| | | | |
|---|---|---|---|
| 10,147,460 B2 | 12/2018 | Ullrich | |
| 10,152,695 B1 | 12/2018 | Chiu et al. | |
| 10,152,696 B2 | 12/2018 | Thankappan et al. | |
| 10,168,866 B2 | 1/2019 | Wakeen et al. | |
| 10,178,427 B2 | 1/2019 | Huang | |
| 10,235,008 B2 | 3/2019 | Lee et al. | |
| 10,242,345 B2 | 3/2019 | Taylor et al. | |
| 10,268,736 B1 | 4/2019 | Balasia et al. | |
| 10,296,873 B1 | 5/2019 | Balasia et al. | |
| 10,310,361 B1 | 6/2019 | Featherstone | |
| 10,318,927 B2 | 6/2019 | Champaneria | |
| 10,325,243 B1 | 6/2019 | Ross et al. | |
| 10,325,517 B2 | 6/2019 | Nielson et al. | |
| 10,331,764 B2 | 6/2019 | Rao et al. | |
| 10,346,805 B2 | 7/2019 | Taylor et al. | |
| 10,346,928 B2 | 7/2019 | Li et al. | |
| 10,353,720 B1 | 7/2019 | Wich-vila | |
| 10,433,030 B2 | 10/2019 | Packard et al. | |
| 10,438,135 B2 | 10/2019 | Larsen et al. | |
| 10,489,439 B2 | 11/2019 | Calapodescu et al. | |
| 10,607,188 B2 | 3/2020 | Kyllonen et al. | |
| 10,657,498 B2 | 5/2020 | Dey et al. | |
| 10,694,097 B1 | 6/2020 | Shirakyan | |
| 10,728,443 B1 | 7/2020 | Olshansky | |
| 10,735,396 B2 | 8/2020 | Krstic et al. | |
| 10,748,118 B2 | 8/2020 | Fang | |
| 10,796,217 B2 | 10/2020 | Wu | |
| 10,963,841 B2 | 3/2021 | Olshansky | |
| 11,023,735 B1 | 6/2021 | Olshansky | |
| 11,127,232 B2 | 9/2021 | Olshansky | |
| 2001/0001160 A1 | 5/2001 | Shoff et al. | |
| 2001/0038746 A1 | 11/2001 | Hughes et al. | |
| 2002/0097984 A1 | 7/2002 | Abecassis | |
| 2002/0113879 A1 | 8/2002 | Battle et al. | |
| 2002/0122659 A1 | 9/2002 | McGrath et al. | |
| 2002/0191071 A1 | 12/2002 | Rui et al. | |
| 2003/0005429 A1 | 1/2003 | Colsey | |
| 2003/0027611 A1 | 2/2003 | Recard | |
| 2003/0189589 A1 | 10/2003 | Leblanc et al. | |
| 2003/0194211 A1 | 10/2003 | Abecassis | |
| 2004/0033061 A1 | 2/2004 | Hughes et al. | |
| 2004/0186743 A1 | 9/2004 | Cordero | |
| 2004/0264919 A1 | 12/2004 | Taylor et al. | |
| 2005/0060175 A1* | 3/2005 | Farber | G06Q 10/1053 705/321 |
| 2005/0095569 A1 | 5/2005 | Franklin | |
| 2005/0137896 A1 | 6/2005 | Pentecost et al. | |
| 2005/0187765 A1 | 8/2005 | Kim et al. | |
| 2005/0232462 A1 | 10/2005 | Vallone et al. | |
| 2005/0235033 A1 | 10/2005 | Doherty | |
| 2005/0271251 A1 | 12/2005 | Russell et al. | |
| 2006/0042483 A1 | 3/2006 | Work et al. | |
| 2006/0045179 A1 | 3/2006 | Mizuno et al. | |
| 2006/0100919 A1 | 5/2006 | Levine | |
| 2006/0116555 A1 | 6/2006 | Pavlidis et al. | |
| 2006/0229896 A1 | 10/2006 | Rosen et al. | |
| 2007/0088601 A1 | 4/2007 | Money et al. | |
| 2007/0124161 A1 | 5/2007 | Mueller et al. | |
| 2007/0237502 A1 | 10/2007 | Ryckman et al. | |
| 2007/0288245 A1 | 12/2007 | Benjamin | |
| 2008/0086504 A1 | 4/2008 | Sanders et al. | |
| 2009/0083103 A1 | 3/2009 | Basser | |
| 2009/0083670 A1 | 3/2009 | Roos | |
| 2009/0087161 A1 | 4/2009 | Roberts et al. | |
| 2009/0144785 A1 | 6/2009 | Walker et al. | |
| 2009/0171899 A1 | 7/2009 | Chittoor et al. | |
| 2009/0248685 A1 | 10/2009 | Pasqualoni et al. | |
| 2009/0258334 A1 | 10/2009 | Pyne | |
| 2010/0086283 A1 | 4/2010 | Ramachandran et al. | |
| 2010/0143329 A1 | 6/2010 | Larsen | |
| 2010/0183280 A1 | 7/2010 | Beauregard et al. | |
| 2010/0191561 A1 | 7/2010 | Jeng et al. | |
| 2010/0199228 A1 | 8/2010 | Latta et al. | |
| 2010/0223109 A1 | 9/2010 | Hawn et al. | |
| 2010/0325307 A1 | 12/2010 | Roos | |
| 2011/0055098 A1 | 3/2011 | Stewart | |
| 2011/0055930 A1 | 3/2011 | Flake et al. | |
| 2011/0060671 A1 | 3/2011 | Erbey et al. | |
| 2011/0076656 A1 | 3/2011 | Scott et al. | |
| 2011/0088081 A1 | 4/2011 | Folkesson et al. | |
| 2011/0135279 A1 | 6/2011 | Leonard | |
| 2012/0036127 A1 | 2/2012 | Work et al. | |
| 2012/0053996 A1 | 3/2012 | Galbavy | |
| 2012/0084649 A1 | 4/2012 | Dowdell et al. | |
| 2012/0114246 A1 | 5/2012 | Weitzman | |
| 2012/0130771 A1 | 5/2012 | Kannan et al. | |
| 2012/0257875 A1 | 10/2012 | Sharpe et al. | |
| 2012/0271774 A1 | 10/2012 | Clegg | |
| 2013/0007670 A1 | 1/2013 | Roos | |
| 2013/0016815 A1 | 1/2013 | Odinak et al. | |
| 2013/0016816 A1 | 1/2013 | Odinak et al. | |
| 2013/0016823 A1 | 1/2013 | Odinak et al. | |
| 2013/0024105 A1 | 1/2013 | Thomas | |
| 2013/0111401 A1 | 5/2013 | Newman et al. | |
| 2013/0121668 A1 | 5/2013 | Meaney et al. | |
| 2013/0124998 A1 | 5/2013 | Pendergast et al. | |
| 2013/0124999 A1 | 5/2013 | Agnoli et al. | |
| 2013/0125000 A1 | 5/2013 | Fleischhauer et al. | |
| 2013/0177296 A1 | 7/2013 | Geisner et al. | |
| 2013/0212033 A1 | 8/2013 | Work et al. | |
| 2013/0212180 A1 | 8/2013 | Work et al. | |
| 2013/0216206 A1 | 8/2013 | Dubin et al. | |
| 2013/0218688 A1 | 8/2013 | Roos | |
| 2013/0222601 A1 | 8/2013 | Engstroem et al. | |
| 2013/0226578 A1 | 8/2013 | Bolton et al. | |
| 2013/0226674 A1 | 8/2013 | Field et al. | |
| 2013/0226910 A1 | 8/2013 | Work et al. | |
| 2013/0254192 A1 | 9/2013 | Work et al. | |
| 2013/0259447 A1 | 10/2013 | Sathish et al. | |
| 2013/0266925 A1 | 10/2013 | Nunamaker et al. | |
| 2013/0268452 A1 | 10/2013 | MacEwen et al. | |
| 2013/0283378 A1 | 10/2013 | Costigan et al. | |
| 2013/0290210 A1 | 10/2013 | Cline et al. | |
| 2013/0290325 A1 | 10/2013 | Work et al. | |
| 2013/0290420 A1 | 10/2013 | Work et al. | |
| 2013/0290448 A1 | 10/2013 | Work et al. | |
| 2013/0297589 A1 | 11/2013 | Work et al. | |
| 2013/0332381 A1 | 12/2013 | Clark et al. | |
| 2013/0332382 A1 | 12/2013 | Lapasta et al. | |
| 2014/0012586 A1* | 1/2014 | Rubin | G10L 15/22 704/E21.001 |
| 2014/0036023 A1 | 2/2014 | Croen et al. | |
| 2014/0089217 A1 | 3/2014 | McGovern et al. | |
| 2014/0092254 A1 | 4/2014 | Mughal et al. | |
| 2014/0123177 A1 | 5/2014 | Kim et al. | |
| 2014/0125703 A1 | 5/2014 | Roveta et al. | |
| 2014/0143165 A1 | 5/2014 | Posse et al. | |
| 2014/0153902 A1 | 6/2014 | Pearson et al. | |
| 2014/0186004 A1 | 7/2014 | Hamer | |
| 2014/0191939 A1 | 7/2014 | Penn et al. | |
| 2014/0192200 A1 | 7/2014 | Zagron | |
| 2014/0198196 A1 | 7/2014 | Howard et al. | |
| 2014/0214709 A1 | 7/2014 | Greaney | |
| 2014/0245146 A1 | 8/2014 | Roos | |
| 2014/0258288 A1 | 9/2014 | Work et al. | |
| 2014/0270706 A1 | 9/2014 | Pasko | |
| 2014/0278506 A1 | 9/2014 | Rogers et al. | |
| 2014/0278683 A1 | 9/2014 | Kennell et al. | |
| 2014/0279634 A1 | 9/2014 | Seeker | |
| 2014/0282709 A1 | 9/2014 | Hardy et al. | |
| 2014/0317009 A1 | 10/2014 | Bilodeau et al. | |
| 2014/0317126 A1 | 10/2014 | Work et al. | |
| 2014/0325359 A1 | 10/2014 | Vehovsky et al. | |
| 2014/0325373 A1 | 10/2014 | Kramer et al. | |
| 2014/0327779 A1 | 11/2014 | Eronen et al. | |
| 2014/0330734 A1 | 11/2014 | Sung et al. | |
| 2014/0336942 A1 | 11/2014 | Pe'er et al. | |
| 2014/0337900 A1 | 11/2014 | Hurley | |
| 2014/0356822 A1 | 12/2014 | Hoque et al. | |
| 2014/0358810 A1 | 12/2014 | Hardtke et al. | |
| 2014/0359439 A1 | 12/2014 | Lyren | |
| 2015/0003603 A1 | 1/2015 | Odinak et al. | |
| 2015/0003605 A1 | 1/2015 | Odinak et al. | |
| 2015/0006422 A1 | 1/2015 | Carter et al. | |

(56) References Cited

U.S. PATENT DOCUMENTS

| | | |
|---|---|---|
| 2015/0012453 A1 | 1/2015 | Odinak et al. |
| 2015/0046357 A1 | 2/2015 | Danson et al. |
| 2015/0063775 A1 | 3/2015 | Nakamura et al. |
| 2015/0067723 A1 | 3/2015 | Bloch et al. |
| 2015/0099255 A1 | 4/2015 | Aslan et al. |
| 2015/0100702 A1 | 4/2015 | Krishna et al. |
| 2015/0127565 A1 | 5/2015 | Chevalier et al. |
| 2015/0139601 A1 | 5/2015 | Mate et al. |
| 2015/0154564 A1 | 6/2015 | Moon et al. |
| 2015/0155001 A1 | 6/2015 | Kikugawa et al. |
| 2015/0170303 A1 | 6/2015 | Geritz et al. |
| 2015/0201134 A1 | 7/2015 | Carr et al. |
| 2015/0205800 A1 | 7/2015 | Work et al. |
| 2015/0205872 A1 | 7/2015 | Work et al. |
| 2015/0206102 A1 | 7/2015 | Cama et al. |
| 2015/0222815 A1 | 8/2015 | Wang et al. |
| 2015/0228306 A1 | 8/2015 | Roberts et al. |
| 2015/0242707 A1 | 8/2015 | Wilf et al. |
| 2015/0269165 A1 | 9/2015 | Work et al. |
| 2015/0269529 A1 | 9/2015 | Kyllonen et al. |
| 2015/0269530 A1 | 9/2015 | Work et al. |
| 2015/0271289 A1 | 9/2015 | Work et al. |
| 2015/0278223 A1 | 10/2015 | Work et al. |
| 2015/0278290 A1 | 10/2015 | Work et al. |
| 2015/0278964 A1 | 10/2015 | Work et al. |
| 2015/0324698 A1 | 11/2015 | Karaoguz et al. |
| 2015/0339939 A1 | 11/2015 | Gustafson et al. |
| 2015/0356512 A1 | 12/2015 | Bradley |
| 2015/0380052 A1 | 12/2015 | Hamer |
| 2016/0005029 A1 | 1/2016 | Ivey et al. |
| 2016/0036976 A1 | 2/2016 | Odinak et al. |
| 2016/0104096 A1 | 4/2016 | Ovick et al. |
| 2016/0116827 A1 | 4/2016 | Tarres Bolos |
| 2016/0117942 A1 | 4/2016 | Marino et al. |
| 2016/0139562 A1 | 5/2016 | Crowder et al. |
| 2016/0154883 A1 | 6/2016 | Boerner |
| 2016/0155475 A1 | 6/2016 | Hamer |
| 2016/0180234 A1 | 6/2016 | Siebach et al. |
| 2016/0180883 A1 | 6/2016 | Hamer |
| 2016/0219264 A1 | 7/2016 | Delvaux et al. |
| 2016/0225409 A1 | 8/2016 | Eris |
| 2016/0225410 A1 | 8/2016 | Lee et al. |
| 2016/0247537 A1 | 8/2016 | Ricciardi |
| 2016/0267436 A1 | 9/2016 | Silber et al. |
| 2016/0313892 A1 | 10/2016 | Roos |
| 2016/0323608 A1 | 11/2016 | Bloch et al. |
| 2016/0330398 A1 | 11/2016 | Recchia et al. |
| 2016/0364692 A1 | 12/2016 | Bhaskaran et al. |
| 2017/0026667 A1 | 1/2017 | Pasko |
| 2017/0039525 A1 | 2/2017 | Seidle et al. |
| 2017/0076751 A9 | 3/2017 | Hamer |
| 2017/0134776 A1 | 5/2017 | Ranjeet et al. |
| 2017/0164013 A1 | 6/2017 | Abramov et al. |
| 2017/0164014 A1 | 6/2017 | Abramov et al. |
| 2017/0164015 A1 | 6/2017 | Abramov et al. |
| 2017/0171602 A1 | 6/2017 | Qu |
| 2017/0178688 A1 | 6/2017 | Ricciardi |
| 2017/0195491 A1 | 7/2017 | Odinak et al. |
| 2017/0206504 A1 | 7/2017 | Taylor et al. |
| 2017/0213190 A1 | 7/2017 | Hazan |
| 2017/0213573 A1 | 7/2017 | Takeshita et al. |
| 2017/0227353 A1 | 8/2017 | Brunner |
| 2017/0236073 A1 | 8/2017 | Borisyuk et al. |
| 2017/0244894 A1 | 8/2017 | Aggarwal et al. |
| 2017/0244984 A1 | 8/2017 | Aggarwal et al. |
| 2017/0244991 A1 | 8/2017 | Aggarwal et al. |
| 2017/0262706 A1 | 9/2017 | Sun et al. |
| 2017/0264958 A1 | 9/2017 | Hutten |
| 2017/0293413 A1 | 10/2017 | Matsushita et al. |
| 2017/0316806 A1 | 11/2017 | Warren et al. |
| 2017/0332044 A1 | 11/2017 | Marlow et al. |
| 2017/0353769 A1 | 12/2017 | Husain et al. |
| 2017/0372748 A1 | 12/2017 | McCauley et al. |
| 2018/0011621 A1 | 1/2018 | Roos |
| 2018/0025303 A1 | 1/2018 | Janz |
| 2018/0054641 A1 | 2/2018 | Hall et al. |
| 2018/0070045 A1 | 3/2018 | Holmes |
| 2018/0074681 A1 | 3/2018 | Roos |
| 2018/0082238 A1 | 3/2018 | Shani |
| 2018/0082680 A1* | 3/2018 | Pereg ................ G10L 15/1822 |
| 2018/0096307 A1 | 4/2018 | Fortier et al. |
| 2018/0109737 A1 | 4/2018 | Nakamura et al. |
| 2018/0109826 A1 | 4/2018 | McCoy et al. |
| 2018/0110460 A1 | 4/2018 | Danson et al. |
| 2018/0114154 A1 | 4/2018 | Bae |
| 2018/0130497 A1 | 5/2018 | McCauley et al. |
| 2018/0132014 A1 | 5/2018 | Khazanov et al. |
| 2018/0150604 A1 | 5/2018 | Arena et al. |
| 2018/0158027 A1 | 6/2018 | Venigalla |
| 2018/0182436 A1 | 6/2018 | Ullrich |
| 2018/0191955 A1 | 7/2018 | Aoki et al. |
| 2018/0218238 A1 | 8/2018 | Viirre et al. |
| 2018/0226102 A1 | 8/2018 | Roberts et al. |
| 2018/0227501 A1 | 8/2018 | King |
| 2018/0232751 A1 | 8/2018 | Terhark et al. |
| 2018/0247271 A1 | 8/2018 | Van Hoang et al. |
| 2018/0253697 A1 | 9/2018 | Sung et al. |
| 2018/0268868 A1 | 9/2018 | Salokannel et al. |
| 2018/0270613 A1 | 9/2018 | Park |
| 2018/0302680 A1 | 10/2018 | Cormican |
| 2018/0308521 A1 | 10/2018 | Iwamoto |
| 2018/0316947 A1 | 11/2018 | Todd |
| 2018/0336528 A1 | 11/2018 | Carpenter et al. |
| 2018/0336930 A1 | 11/2018 | Takahashi |
| 2018/0350405 A1 | 12/2018 | Marco et al. |
| 2018/0353769 A1 | 12/2018 | Smith et al. |
| 2018/0374251 A1 | 12/2018 | Mitchell et al. |
| 2018/0376225 A1 | 12/2018 | Jones et al. |
| 2019/0005373 A1 | 1/2019 | Nims et al. |
| 2019/0019157 A1 | 1/2019 | Saha et al. |
| 2019/0057356 A1 | 2/2019 | Larsen et al. |
| 2019/0087455 A1* | 3/2019 | He ........................ G06F 40/35 |
| 2019/0087558 A1 | 3/2019 | Mercury et al. |
| 2019/0096307 A1 | 3/2019 | Liang et al. |
| 2019/0141033 A1 | 5/2019 | Kaafar et al. |
| 2019/0220824 A1 | 7/2019 | Liu |
| 2019/0244176 A1 | 8/2019 | Chuang et al. |
| 2019/0259002 A1 | 8/2019 | Balasia et al. |
| 2019/0295040 A1 | 9/2019 | Clines |
| 2019/0311488 A1 | 10/2019 | Sareen |
| 2019/0325064 A1 | 10/2019 | Mathiesen et al. |
| 2020/0012350 A1 | 1/2020 | Tay |
| 2020/0110786 A1 | 4/2020 | Kim |
| 2020/0126545 A1 | 4/2020 | Kakkar et al. |
| 2020/0143329 A1 | 5/2020 | Gamaliel |
| 2020/0175961 A1* | 6/2020 | Thomson ................ G10L 15/22 |
| 2020/0311163 A1 | 10/2020 | Ma et al. |
| 2020/0311682 A1 | 10/2020 | Olshansky |
| 2020/0311953 A1 | 10/2020 | Olshansky |
| 2020/0396376 A1 | 12/2020 | Olshansky |
| 2021/0035047 A1 | 2/2021 | Mossoba et al. |
| 2021/0158663 A1 | 5/2021 | Buchholz et al. |
| 2021/0174308 A1 | 6/2021 | Olshansky |
| 2021/0233262 A1 | 7/2021 | Olshansky |

FOREIGN PATENT DOCUMENTS

| | | |
|---|---|---|
| CA | 2206105 | 12/2000 |
| CA | 2763634 | 12/2012 |
| CN | 109146430 | 1/2019 |
| EP | 1376584 | 1/2004 |
| EP | 1566748 | 8/2005 |
| EP | 1775949 | 12/2007 |
| EP | 1954041 | 8/2008 |
| JP | 2009258175 | 11/2009 |
| JP | 2019016192 | 1/2019 |
| WO | 9703366 | 1/1997 |
| WO | 9713366 | 4/1997 |
| WO | 9713367 | 4/1997 |
| WO | 9828908 | 7/1998 |
| WO | 9841978 | 9/1998 |
| WO | 9905865 | 2/1999 |
| WO | 0133421 | 5/2001 |
| WO | 0117250 | 9/2002 |

(56) References Cited

FOREIGN PATENT DOCUMENTS

| | | |
|---|---|---|
| WO | 03003725 | 1/2003 |
| WO | 2004062563 | 7/2004 |
| WO | 2005114377 | 12/2005 |
| WO | 2006103578 | 10/2006 |
| WO | 2006129496 | 12/2006 |
| WO | 2007039994 | 4/2007 |
| WO | 2007097218 | 8/2007 |
| WO | 2008029803 | 3/2008 |
| WO | 2008039407 | 4/2008 |
| WO | 2009042858 | 4/2009 |
| WO | 2009042900 | 4/2009 |
| WO | 2009075190 | 6/2009 |
| WO | 2009116955 | 9/2009 |
| WO | 2009157446 | 12/2009 |
| WO | 2010055624 | 5/2010 |
| WO | 2010116998 | 10/2010 |
| WO | 2011001180 | 1/2011 |
| WO | 2011007011 | 1/2011 |
| WO | 2011035419 | 3/2011 |
| WO | 2011129578 | 10/2011 |
| WO | 2011136571 | 11/2011 |
| WO | 2012002896 | 1/2012 |
| WO | 2012068433 | 5/2012 |
| WO | 2012039959 | 6/2012 |
| WO | 2012089855 | 7/2012 |
| WO | 2013026095 | 2/2013 |
| WO | 2013039351 | 3/2013 |
| WO | 2013074207 | 5/2013 |
| WO | 2013088208 | 6/2013 |
| WO | 2013093176 | 6/2013 |
| WO | 2013131134 | 9/2013 |
| WO | 2013165923 | 11/2013 |
| WO | 2014089362 | 6/2014 |
| WO | 2014093668 | 6/2014 |
| WO | 2014152021 | 9/2014 |
| WO | 2014163283 | 10/2014 |
| WO | 2014164549 | 10/2014 |
| WO | 2015031946 | 4/2015 |
| WO | 2015071490 | 5/2015 |
| WO | 2015109290 | 7/2015 |
| WO | 2016031431 | 3/2016 |
| WO | 2016053522 | 4/2016 |
| WO | 2016073206 | 5/2016 |
| WO | 2016123057 | 8/2016 |
| WO | 2016138121 | 9/2016 |
| WO | 2016138161 | 9/2016 |
| WO | 2016186798 | 11/2016 |
| WO | 2016189348 | 12/2016 |
| WO | 2017022641 | 2/2017 |
| WO | 2017042831 | 3/2017 |
| WO | 2017049612 | 3/2017 |
| WO | 2017051063 | 3/2017 |
| WO | 2017096271 | 6/2017 |
| WO | 2017130810 | 8/2017 |
| WO | 2017150772 | 9/2017 |
| WO | 2017192125 | 11/2017 |
| WO | 2018042175 | 3/2018 |
| WO | 2018094443 | 5/2018 |
| WO | 2020198230 | 10/2020 |
| WO | 2020198240 | 10/2020 |
| WO | 2020198363 | 10/2020 |
| WO | 2021108564 | 6/2021 |

OTHER PUBLICATIONS

"American Express Frequently Asked Question: Why were Membership Rewards points forfeited and how can I reinstate them?" https://www.americanexpress.com/us/customer-service/faq.membership-rewards-points-forfeiture.html, 2 pages.
"DaXtra Parser (CVX) Technical Specifications," DaXtra Parser Spec. available at URL: <https://cvxdemo.daxtra.com/cvx/download/Parser%20Technical%20Specifications.pdf> at least as early as Feb. 25, 2021 (3 pages).
File History for U.S. Appl. No. 16/366,746, filed Sep. 7, 2021 (353 pages).
File History for U.S. Appl. No. 16/828,578, filed Sep. 7, 2021 (353 pages).
File History for U.S. Appl. No. 16/366,703, filed Sep. 7, 2021 (727 pages).
File History for U.S. Appl. No. 17/212,688, filed Sep. 7, 2021 (311 pages).
File History for U.S. Appl. No. 16/696,781, filed Sep. 7, 2021 (453 pages).
File History for U.S. Appl. No. 17/025,902, filed Sep. 7, 2021 (368 pages).
File History for U.S. Appl. No. 16/931,964, filed Sep. 7, 2021 (259 pages).
"International Search Report and Written Opinion," for PCT Application No. PCT/US2020/024470 dated Jul. 9, 2020 (13 pages).
"International Search Report and Written Opinion," for PCT Application No. PCT/US2020/024488 dated May 19, 2020 (14 pages).
"International Search Report and Written Opinion," for PCT Application No. PCT/US2020/024722 dated Jul. 10, 2020 (13 pages).
"International Search Report and Written Opinion," for PCT Application No. PCT/US2020/062246 dated Apr. 1, 2021 (18 pages).
"International Search Report and Written Opinion," for PCT Application No. PCT/US2021/024423 dated Jun. 16, 2021 (13 pages).
"International Search Report and Written Opinion," for PCT Application No. PCT/US2021/024450 dated Jun. 4, 2021 (14 pages).
"Invitation to Pay Additional Fees," for PCT Application No. PCT/US2020/062246 dated Feb. 11, 2021 (14 pages).
"Non-Final Office Action," for U.S. Appl. No. 16/910,986 dated Jun. 23, 2021 (70 pages).
"Nurse Resumes," Post Job Free Resume Search Results for "nurse" available at URL <https://www.postjobfree.com/resumes?q=nurse&l=&radius=25> at least as early as Jan. 26, 2021 (2 pages).
"Nurse," LiveCareer Resume Search results available online at URL <https://www.livecareer.com/resume-search/search?jt=nurse> website published as early as Dec. 21, 2017 (4 pages).
"Resume Database," Mighty Recruiter Resume Database available online at URL <https://www.mightyrecruiter.com/features/resume-database> at least as early as Sep. 4, 2017 (6 pages).
"Resume Library," Online job board available at Resume-library.com at least as early as Aug. 6, 2019 (6 pages).
"Television Studio," Wikipedia, Published Mar. 8, 2019 and retrieved May 27, 2021 from URL <https://en.wikipedia.org/w/index.php?title=Television_studio&oldid=886710983> (3 pages).
"Understanding Multi-Dimensionality in Vector Space Modeling," Pythonic Excursions article published Apr. 16, 2019, accessible at URL <https://aegis4048.github.io/understanding_multi-dimensionality_in_vector_space_modeling> (29 pages).
Advantage Video Systems "Jeffrey Stansfield of AVS interviews rep about Air-Hush products at the 2019 NAMM Expo," YouTube video, available at https://www.youtube.com/watch?v=nWzrM99qk_o, accessed Jan. 17, 2021.
Alley, E. "Professional Autonomy in Video Relay Service Interpreting: Perceptions of American Sign Language-English Interpreters," (Order No. 10304259). Available from ProQuest Dissertations and Theses Professional. (Year: 2016), 209 pages.
Bishop, Todd "Microsoft patents tech to score meetings using body language, facial expressions, other data," Article published Nov. 28, 2020 at URL <https://www.geekwire.com/author/todd/> (7 pages).
Brocardo, Marcelo Luiz, et al. "Verifying Online User Identity using Stylometric Analysis for Short Messages," Journal of Networks, vol. 9, No. 12, Dec. 2014, pp. 3347-3355.
Hughes, K. "Corporate Channels: How American Business and Industry Made Television Useful," (Order No. 10186420). Available from ProQuest Dissertations and Theses Professional. (Year: 2015), 499 pages.
Jakubowski, Kelly, et al. "Extracting Coarse Body Movements from Video in Music Performance: A Comparison of Automated Computer Vision Techniques with Motion Capture Data," Front. Digit. Humanit. 2017, 4:9 (8 pages).

(56) References Cited

OTHER PUBLICATIONS

Johnston, A. M, et al. "A Mediated Discourse Analysis of Immigration Gatekeeping Interviews," (Order No. 3093235). Available from ProQuest Dissertations and Theses Professional (Year: 2003), 262 pages.

Lai, Kenneth, et al. "Decision Support for Video-based Detection of Flu Symptoms," Biometric Technologies Laboratory, Department of Electrical and Computer Engineering, University of Calgary, Canada, Aug. 24, 2020 available at URL <https://ucalgary.ca/labs/biometric-technologies/publications> (8 pages).

Liu, Weihua, et al."RGBD Video Based Human Hand Trajectory Tracking and Gesture Recognition System," Mathematical Problems in Engineering vol. 2015, article ID 863732 (16 pages).

Luenendonk, Martin "The Secrets to Interviewing for a Role That's Slightly Out of Reach," Cleverism Article available at URL <https://www.cleverism.com/interviewing-for-a-role-thats-slightly-out-of-reach/> last updated Sep. 25, 2019 (13 pages).

Pentland, S. J. "Human-Analytics in Information Systems Research and Applications in Personnel Selection," (Order No. 10829600). Available from ProQuest Dissertations and Theses Professional. (Year: 2018), 158 pages.

Ramanarayanan, Vikram, et al. "Evaluating Speech, Face, Emotion and Body Movement Time-series Features for Automated Multimodal Presentation Scoring," In Proceedings of the 2015 ACM on (ICMI 2015). Association for Computing Machinery, New York, NY, USA, 23-30 (8 pages).

Randhavane, Tanmay, et al. "Identifying Emotions from Walking Using Affective and Deep Features," Jan. 9, 2020 Article available at Cornell University website URL <https://arxiv.org/abs/1906.11884v4> (15 pages).

Swanepoel, De Wet, et al."A Systematic Review of Telehealth Applications in Audiology," Telemedicine and e-Health 16.2 (2010): 181-200 (20 pages).

Wang, Jenny "How to Build a Resume Recommender like the Applicant Tracking System (ATS)," Towards Data Science article published Jun. 25, 2020, accessible at URL <https://towardsdatascience.com/resume-screening-tool-resume-recommendation-engine-in-a-nutshell-53fcf6e6559b> (14 pages).

Yun, Jaeseok, et al. "Human Movement Detection and Identification Using Pyroelectric Infrared Sensors," Sensors 2014, 14, 8057-8081 (25 pages).

\* cited by examiner

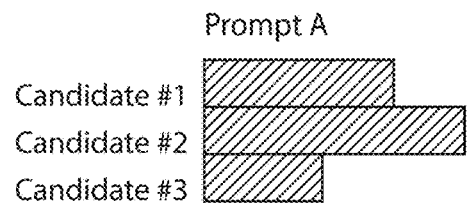
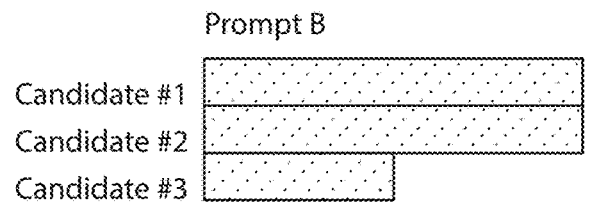
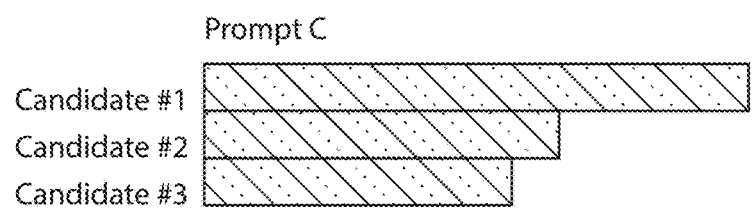
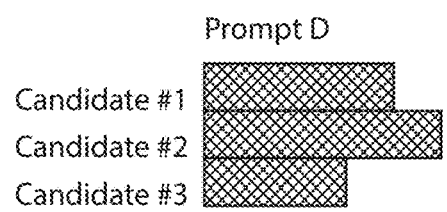
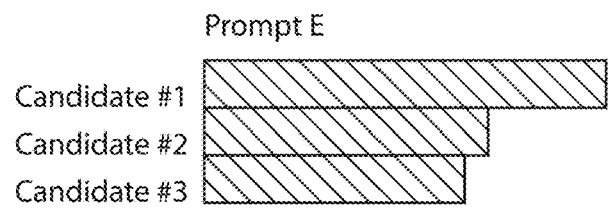
Figure 10

Interview Data

| 26 |
|---|
| act |

| 26 | 29 |
|---|---|
| act | advocate |

| 22 | 24 |
|---|---|
| concerns | I |

| 22 | 24 |
|---|---|
| concerns | I |

| 13 | 15 | 17 |
|---|---|---|
| comfort | understanding | I |

| 2 | 5 | 6 |
|---|---|---|
| feel | patients | know |

| 24 | 26 |
|---|---|
| I | act |

| 1 | 2 | 5 |
|---|---|---|
| I | feel | patients |

| 17 | 19 |
|---|---|
| I | listen |

| 8 | 12 |
|---|---|
| I | provide |

| 6 | 8 |
|---|---|
| know | I |

| 19 |
|---|
| listen |

| 19 | 22 |
|---|---|
| listen | concerns |

| 5 | 6 | 8 |
|---|---|---|
| patients | know | I |

| 12 | 13 |
|---|---|
| provide | comfort |

| 12 | 13 | 15 |
|---|---|---|
| provide | comfort | understanding |

| 15 | 17 |
|---|---|
| understanding | I |

| Candidate N-grams | Database of Successfully-Selected Candidate N-grams for a Particular Prompt |
|---|---|
| 10 11 12 | 10 14 15 |
|  | 10 2 6 |
|  | 10 9 6 |
| 2 5 | 2 6 |
|  | 2 9 |
| 5 6 | 5 6 8 |
| 5 6 9 | 5 6 9 |
|  | 5 9 12 |
|  | 5 12 15 |
| 6 9 10 | 6 4 16 |
| 9 10 11 | 9 10 11 |
|  | 9 10 15 |
| 1 2 | 1 2 |
|  | 1 2 6 |

Figure 22

| Category | Candidate Name | Score | Portion 1 | Portion 2 | Portion 3 |
|---|---|---|---|---|---|
| ■ | Nancy Smith | 86.1 | 95 | 67 | 62 |
| ■ | Joe Thomas | 80.9 | 85 | 65 | 84 |
| ▒ | Jane King | 80.4 | 90 | 72 | 30 |
| ▒ | Beth Li | 72.2 | 80 | 46 | 70 |
| ▒ | Ryan Hill | 71.1 | 85 | 58 | 0 |
|  | Scott Brown | 65.2 | 60 | 72 | 88 |
|  | Laura Cook | 30.6 | 32 | 35 | 12 |
|  | David Thompson | 20.7 | 17 | 44 | 0 |

Figure 23

| Category | Candidate Name | Score | Portion 1 | Portion 2 | Portion 3 |
|---|---|---|---|---|---|
| ■ | Nancy Smith | 86.1 | 95 | 67 | 62 |
| ■ | Joe Thomas | 80.9 | 85 | 65 | 84 |
| ■ | Ryan Hill | 80.6 | 85 | 58 | 95 |
| ▒ | Jane King | 80.4 | 90 | 72 | 30 |
| ▒ | Beth Li | 72.2 | 80 | 46 | 70 |
|  | Scott Brown | 65.2 | 60 | 72 | 88 |
|  | Laura Cook | 30.6 | 32 | 35 | 12 |
|  | David Thompson | 20.7 | 17 | 44 | 0 |

Figure 24

OPEN OPPORTUNITY #1

Criteria Data

Candidate Data

Candidates

- Candidate #1
- Candidate #2
- Candidate #3
- Candidate #4

Candidate Notes:

Figure 25

CANDIDATE DATA RANKING METHOD USING PREVIOUSLY SELECTED CANDIDATE DATA

FIELD

Embodiments herein relate to a computerized method and system that selects, sorts, or displays individual-related data for a plurality of candidates. The selection and sorting can be impacted by a comparison of the data being sorted with previous data found to be preferred.

SUMMARY

Various embodiments provide a method for sorting data the method can include receiving, at a non-transitory computer memory, criteria data from a user regarding an open opportunity, wherein the criteria data comprises textual criteria data and defined field criteria data, wherein the defined field criteria data comprises first defined field criteria data, and second defined field criteria data; receiving, at the non-transitory computer memory, candidate data, wherein the candidate data comprises: textual candidate data; defined field candidate data, wherein the defined field candidate data comprises: first defined field candidate data, and second defined field candidate data; audio data of the candidate responding to a first prompt, a second prompt and a third prompt, wherein the audio data comprises: a first portion audio data of the candidate responding to the first prompt, a second portion audio data of the candidate responding to the second prompt, and a third portion audio data of the candidate responding to the third prompt; storing the candidate data in a candidate profile in a candidate database; evaluating the candidate data, wherein evaluating the candidate data comprises: comparing the textual criteria data with the textual candidate data to determine a first analysis result for the candidate data; comparing the defined field criteria data with the defined field candidate data to determine a defined field analysis result for the candidate data, wherein comparing defined field criteria data with defined field candidate data comprises: comparing the first defined field criteria data to the first defined field candidate data, and comparing the second defined field criteria data to the second defined field candidate data; comparing the audio data of the candidate to a database of successfully-selected candidates to determine an N-gram analysis result for the candidate data, wherein comparing the audio data to the database of successfully-selected candidates comprises: creating a first textual transcript of the audio data for the first portion audio data; removing stop words from the first textual transcript; creating a first N-gram data set of the candidate data based on the first textual transcript with stop words removed; comparing the first N-gram data set of the candidate data to a first N-gram data set of the successfully-selected candidates, wherein the first N-gram data set of the successfully-selected candidates is determined by the successfully-selected candidates' responses to the first prompt; creating a second textual transcript of the audio data for the second portion audio data; removing stop words from the second textual transcript; creating a second N-gram data set based on the second textual transcript with stop words removed; comparing the second N-gram data set of the candidate data to a second N-gram data set of the successfully-selected candidates, wherein the second N-gram data set of the successfully-selected candidates is determined by the successfully-selected candidates' responses to the second prompt; creating a third textual transcript of the audio data for the third portion audio data; removing stop words from the third textual transcript; creating a third N-gram data set based on the third textual transcript with stop words removed; comparing the third N-gram data set of the candidate data to a third N-gram data set of the successfully-selected candidates, wherein the third N-gram data set of the successfully-selected candidates is determined by the successfully-selected candidates' responses to the third prompt; compiling the comparison of the first N-gram data set, the comparison of the second N-gram data set, and the comparison of the third N-gram data set to determine the N-gram analysis result for the audio data; compiling the first analysis result, the direct field analysis result and the N-gram analysis result into an overall analysis result; sorting the candidate data within a plurality of other candidate data using the overall analysis result.

In various embodiments, the method further comprising displaying the sorted candidate data on a user interface to the user.

In various embodiments, the method further comprising sorting the candidate data into one of three groups based on the overall analysis result.

In various embodiments, the first analysis results for the candidate data further comprises a distance analysis between geographical data in the criteria data and geographical data in the textual candidate data.

In various embodiments, the candidate data further comprises video data of the candidate responding to the first prompt, the second prompt, and the third prompt, wherein the video data is recorded simultaneously with the audio data.

In various embodiments, the second portion audio data or the third portion audio data was recorded prior to the first portion audio data.

In various embodiments, the method further comprising removing low-value words from the first N-gram data set, the second N-gram data set, and the third N-gram data set, wherein after removing low-value words from the first N-gram data set, the second N-gram data set and the third N-gram data set, only nouns, adjectives, verbs, and adverbs remain in the first N-gram data set, the second N-gram data set, and the third N-gram data set.

In various embodiments, compiling the first analysis result, the direct field analysis result, and the N-gram analysis results comprises weighting the first analysis result more than the direct field analysis result and the N-gram analysis result.

In various embodiments, compiling the first analysis result, the direct field analysis result, and the N-gram analysis results comprises weighting the direct field analysis result more than the N-gram analysis result.

In various embodiments, the candidate data comprises an initial first portion audio data and a secondary first portion audio data, wherein both the initial first portion audio data and the secondary first portion audio data are of the candidate responding to the first prompt.

In various embodiments, the method further comprising selecting one of the initial first portion audio data or the secondary first portion audio data for creating the first textual transcript.

In various embodiments, comparing the first N-gram data set of the candidate data to a first N-gram data set of the successfully-selected candidates comprises comparing a first N-gram data set of the initial first portion audio data with the first N-gram data set of the successfully-selected candidates and comparing a first N-gram data set of the secondary first portion audio data with the first N-gram data set of the successfully-selected candidates.

In various embodiments, compiling the comparison of the first N-gram data set, the comparison of the second N-gram data set, and the comparison of the third N-gram data set to determine the N-gram analysis result for the audio data comprises: determining a similarity value of the comparison of the first N-gram data set of the initial first portion audio data with the first N-gram data set of the successfully-selected candidates and determining a similarity value of the first N-gram data set of the secondary first portion audio data with the first N-gram data set of the successfully-selected candidates.

In various embodiments, the method further comprising: maintaining the initial first portion audio data for the N-gram analysis result when the similarity value of the first N-gram data set of the initial first portion audio data with the first N-gram data set of the successfully-selected candidate is greater than the similarity value of the first N-gram data set of the secondary first portion audio data with the first N-gram data set of the successfully-selected candidate, or maintaining the secondary first portion audio data for the N-gram analysis result when the similarity value of the first N-gram data set of the secondary first portion audio data with the first N-gram data set of the successfully-selected candidate is greater than the similarity value of the first N-gram data set of the initial first portion audio data with the first N-gram data set of the successfully-selected candidate; and wherein the maintained first portion audio data is incorporated into the compilation of the first analysis result, the direct field analysis result and the N-gram analysis result into the overall analysis result.

Various embodiments provide a method for sorting data. The method comprising: receiving, at a non-transitory computer memory, criteria data from a user regarding an open opportunity; receiving, at the non-transitory computer memory, candidate data, wherein the candidate data comprises audio data of the candidate responding to a first prompt, a second prompt and a third prompt, wherein the audio data comprises: a first portion audio data of the candidate responding to the first prompt, a second portion audio data of the candidate responding to the second prompt, and a third portion audio data of the candidate responding to the third prompt; storing candidate data in a candidate profile in a candidate database; evaluating the candidate data, wherein evaluating the candidate data comprises: comparing the audio data of the candidate to a database of successfully-selected candidates to determine an N-gram analysis result for the candidate data, wherein comparing the audio data to the database of successfully-selected candidates comprises: creating a first textual transcript of the audio data for the first portion audio data; removing stop words from the first textual transcript; creating a first N-gram data set based on the first textual transcript with stop words removed; comparing the first N-gram data set of the candidate data to a first N-gram data set of the successfully-selected candidates, wherein the first N-gram data set of the successfully-selected candidates is determined by the successfully-selected candidates' responses to the first prompt; creating a second textual transcript of the audio data for the second portion audio data; removing stop words from the second textual transcript; creating a second N-gram data set based on the second textual transcript with stop words removed; comparing the second N-gram data set of the candidate data to a second N-gram data set of the successfully-selected candidates, wherein the second N-gram data set of the successfully-selected candidates is determined by the successfully-selected candidates' responses to the second prompt; creating a third textual transcript of the audio data for the third portion audio data; removing stop words from the third textual transcript; creating a third N-gram data set based on the third textual transcript with stop words removed; comparing the third N-gram data set of the candidate data to a third N-gram data set of the successfully-selected candidates, wherein the third N-gram data set of the successfully-selected candidates is determined by the successfully-selected candidates' responses to the third prompt; compiling the comparison of the first N-gram data set, the comparison of the second N-gram data set, and the comparison of the third N-gram data set to determine the N-gram analysis result for the audio data; sorting the candidate data within a plurality of other candidate data using the N-gram analysis result.

In various embodiments, the candidate data comprises an initial first portion audio data and a secondary first portion audio data, wherein both the initial first portion audio data and the secondary first portion audio data are of the candidate responding to the first prompt.

In various embodiments, comparing the first N-gram data set of the candidate data to a first N-gram data set of the successfully-selected candidates comprises: comparing a first N-gram data set of the initial first portion audio data with the first N-gram data set of the successfully-selected candidates and comparing a first N-gram data set of the secondary first portion audio data with the first N-gram data set of the successfully-selected candidates.

In various embodiments, compiling the comparison of the first N-gram data set, the comparison of the second N-gram data set, and the comparison of the third N-gram data set to determine the N-gram analysis result for the audio data comprises: determining a similarity value of the comparison of the first N-gram data set of the initial first portion audio data with the first N-gram data set of the successfully-selected candidates and determining a similarity value of the first N-gram data set of the secondary first portion audio data with the first N-gram data set of the successfully-selected candidates, maintaining the initial first portion audio data for the N-gram analysis result when the similarity value of the first N-gram data set of the initial first portion audio data with the first N-gram data set of the successfully-selected candidate is greater than the similarity value of the first N-gram data set of the secondary first portion audio data with the first N-gram data set of the successfully-selected candidate, or maintaining the secondary first portion audio data for the N-gram analysis result when the similarity value of the first N-gram data set of the secondary first portion audio data with the first N-gram data set of the successfully-selected candidate is greater than the similarity value of the first N-gram data set of the initial first portion audio data with the first N-gram data set of the successfully-selected candidate; and wherein the maintained first portion audio data is incorporated into the compilation of the first analysis result, the direct field analysis result and the N-gram analysis result into the overall analysis result.

Various embodiments provide a method of populating a successfully-selected candidate database for a first type of open opportunity. The method comprising: receiving, at a non-transitory computer memory, criteria data from a user regarding an open opportunity of the first type; receiving, at the non-transitory computer memory, first candidate data, wherein the first candidate data comprises audio data of a first candidate responding to a first prompt, a second prompt and a third prompt, wherein the audio data comprises: a first portion audio data of the first candidate responding to the first prompt, a second portion audio data of the first candidate responding to the second prompt, and a third portion audio data of the first candidate responding to the third prompt; storing first candidate data in a first candidate profile in a candidate database; receiving an indication that the first candidate was selected for the open opportunity; saving the first candidate data in a successfully-selected candidate database for open opportunities of the first type, wherein the first candidate data comprises: a first N-gram data set; wherein the first N-gram data set is created by: creating a first textual transcript of the audio data for the first portion audio data; removing stop words from the first textual transcript; and forming a plurality of N-grams based on the first textual transcript with stop words removed, wherein the first N-gram data set comprises the plurality of N-grams; a second N-gram data set; wherein the second N-gram data set is created by: creating a second textual transcript of the audio data for the second portion audio data; removing stop words from the second textual transcript; and forming a plurality of N-grams based on the first textual transcript with stop words removed, wherein the first N-gram data set comprises the plurality of N-grams; a third N-gram data set; wherein the third N-gram data set is created by: creating a third textual transcript of the audio data for the third portion audio data; removing stop words from the third textual transcript; and forming a plurality of N-grams based on the third textual transcript with stop words removed, wherein the third N-gram data set comprises the plurality of N-grams.

In various embodiments, the method further comprising: receiving, at a non-transitory computer memory, criteria data from a second user regarding a second open opportunity of the first type; receiving, at the non-transitory computer memory, second candidate data, wherein the second candidate data comprises audio data of a second candidate responding to the first prompt, the second prompt and the third prompt, wherein the audio data comprises: a first portion audio data of the second candidate responding to the first prompt, a second portion audio data of the second candidate responding to the second prompt, and a third portion audio data of the second candidate responding to the third prompt; storing second candidate data in a second candidate profile in the candidate database; receiving an indication that the second candidate was selected for the second open opportunity; saving the second candidate data in the successfully-selected candidate database for open opportunities of the first type, wherein the second candidate data comprises: a first N-gram data set; wherein the first N-gram data set is created by: creating a first textual transcript of the audio data for the first portion audio data; removing stop words from the first textual transcript; and forming a plurality of N-grams based on the first textual transcript with stop words removed, wherein the first N-gram data set comprises the plurality of N-grams; a second N-gram data set; wherein the second N-gram data set is created by: creating a second textual transcript of the audio data for the second portion audio data; removing stop words from the second textual transcript; and forming a plurality of N-grams based on the first textual transcript with stop words removed, wherein the first N-gram data set comprises the plurality of N-grams; a third N-gram data set; wherein the third N-gram data set is created by: creating a third textual transcript of the audio data for the third portion audio data; removing stop words from the third textual transcript; and forming a plurality of N-grams based on the third textual transcript with stop words removed, wherein the third N-gram data set comprises the plurality of N-grams.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which:

FIG. 10 is a schematic of various candidate data recordings being compared in accordance with various embodiments herein.

FIG. 17 is a schematic of a modified transcript of audio data in accordance with various embodiments herein.

FIG. 19 is a schematic of N-grams of audio data in accordance with various embodiments herein.

FIG. 21 is a schematic of N-grams of audio data in accordance with various embodiments herein.

FIG. 22 is a schematic of an N-gram comparison in accordance with various embodiments herein.

FIG. 23 is a schematic of a user interface showing candidate ranking in accordance with various embodiments herein.

FIG. 24 is a schematic of a user interface showing candidate ranking in accordance with various embodiments herein.

FIG. 25 is a schematic of a user interface in accordance with various embodiments herein.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Various embodiments of searching and sorting systems and methods are described herein. The systems and methods described herein can including sorting one or more candidates for an open opportunity. The systems and methods described herein can compare candidate data with criteria data to determine a candidate's fit for an open opportunity. The candidate data can include facts or other information about the candidate that can be used to determine the candidate's fit or qualification for the open opportunity. Criteria data can include requirements or attributes that are desired for the open opportunity.

In various embodiments described herein, the systems and methods can use an N-gram analysis to sort or order current candidate data within a pool of other current candidate data. The N-gram analysis can be used to compare current candidate data with data of previously known successfully-selected candidates. Current candidates can be sorted, at least in part, based on their comparisons with the successfully-selected candidates.

In an example, the systems and methods described herein can be used to fill a job opening. The candidates that apply for the job can record video interviews, where audio responses of the candidate can be recorded in response to several prompts. The current candidate responses to the prompts can be compared to responses from previous candidates to the same prompts. The previous candidates can be limited to previous candidates that were successfully selected or hired for previous similar or same job openings. By comparing current candidates with candidates that are known to be desired and successful for similar opportunities, the pool of current candidates can be reduced or sorted to result in easier, more efficient, and better selection of candidates.

The various methods described herein use an N-gram analysis. An N-gram can refer to one or more words that are grouped together in a specific order, where "N" can refer to any number, such as five, four, three, two or one. In an example, a bigram is a combination of two words and a trigram is a combination of three words. In some examples, an N-gram data set can include groups of written units of N or less. As used herein N-gram can refer to any group of consecutive written units, such as words. A set of N-grams can include a group of consecutive written units. For example, a set of N-grams can include trigrams, bigrams, and single words.

Figure 1:
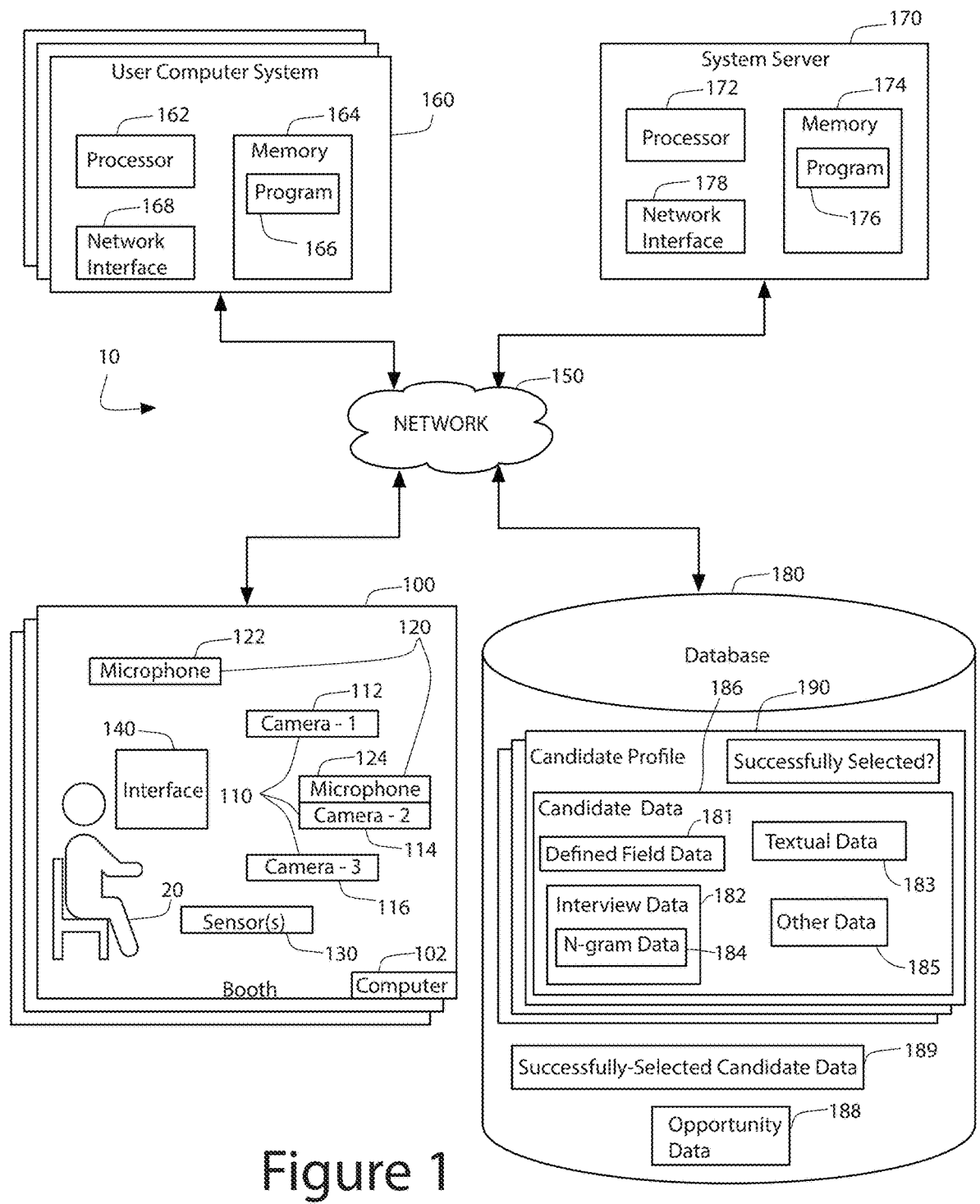
FIG. 1 is a schematic of various components in a searching system in accordance with various embodiments herein.

FIG. 1 is a schematic view of various components in or supporting the searching and sorting system 10 in accordance with various embodiments herein. FIG. 1 shows the system 10 can include a booth 100 that gathers candidate data about the candidate 20. The system 10 can include a user computer system 160, a system server 170, and a database 180. These components 100, 160, 170, 180 can be connected or linked together by network 150.

In various embodiments, the booth 100 can be optimized to goals related to the searching and evaluating process described herein. In some embodiment, multiple booths 100 can be placed in high traffic areas, such as airports and shopping malls. The multiple booths can be connected across the network 150 to provide and share data.

In some embodiments, the booth 100 is configured to record high-quality audio and video data of a candidate. The high-quality audio can be utilized to create a transcript of the candidate in the booth. The booth 100 can show a candidate in their best light using the high-quality audio and video recording elements. The booth 100 can further output an audiovisual recording of a video interview of the candidate in the booth. The booth 100 can apply video editing techniques, such as camera switching, to ensure the output audiovisual recording is engaging and interesting for busy users of the system to further evaluate candidates. In various embodiments, the entity that maintains, controls and services the booth 100 can also be the entity that manages the system server. The entity that manages the system server can be independent of and serves both the user and the candidates.

Figure 2:
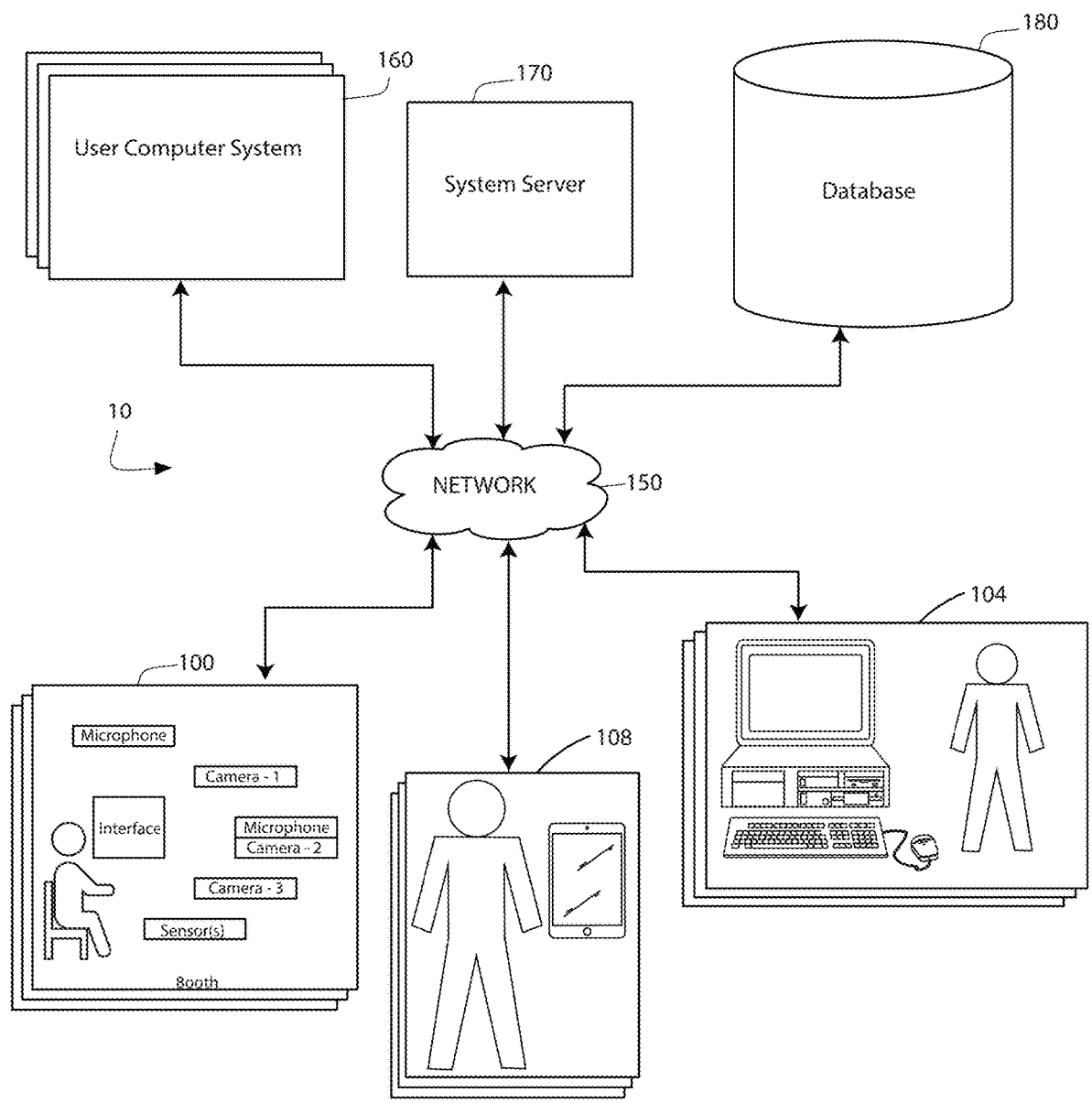
FIG. 2 is a schematic of various components in the searching system in accordance with various embodiments herein.

In some embodiments, candidate data can be recorded within the booth 100. In other embodiments, as shown in FIG. 2, candidate data can be recorded and uploaded to the network 150 from a candidate computer 104 or other electronic device, such as a cell phone or tablet computer. For example, a candidate 20 can record a video interview within the booth 100. The video interview can include the candidate 20 responding to various prompts, such as questions.

The booth 100 can include cameras 110 for recording candidate data in the form of video data of the candidate within the booth 100. In some embodiments the booth 100 can include a plurality of cameras 110, such as camera-1 112, camera-2 114, and camera-3 116.

The booth 100 can include microphones 120 for recording candidate data in the form of audio data of the candidate within the booth 100. In some embodiments, the booth 100 can include a plurality of microphones 120, such as a first microphone 122 and a second microphone 124.

The booth 100 or other device can gather candidate data in order to evaluate the candidate for the open position. Data recorded from the booth 100 or otherwise uploaded into the system 10 can be managed in part by the system server 170 and stored in database 180. In some embodiments, the system server 170 allows multiple user computer systems 160 to access candidate data from multiple booths 100.

The sound or audio data from the microphones 120 can be combined with the visual data from the cameras 112, 114, 116 into audio video material for evaluation of the candidate. In some embodiments, the audio data can be kept separate from the video data for analysis.

The sound recorded by the microphones 120 can also be used for behavioral analysis of the candidate 20. Speech recorded by the microphones 120 can be analyzed to extract behavioral data, such as vocal pitch and vocal tone, speech cadence, word patterns, word frequencies, total time spent speaking, and other information conveyed in the speaker's voice and speech.

The booth 100 can also incorporate one or more depth sensors 130 that can detect changes in the position of the candidate 20. Only one depth sensor 130 is shown in FIG. 1, but some embodiments will utilize multiple depth sensors 130 aimed at different portions of the candidate 20. The depth sensors 130 can utilize one or more known technologies that are able to record the position and movement of the candidate 20, such as stereoscopic optical depth sensor technology, infrared sensors, laser sensors, or even LIDAR sensors. These sensors 130 generate information about the facial expression, body movement, body posture, and hand gestures of candidate 20. Depth sensors 130 can also be referred to as behavioral sensors, and data from these sensors 130 can be combined with information obtained from video cameras 112, 114, 116 and microphones 120 to provide detailed behavioral data concerning the candidate 20. This information can then be used to extrapolate information about the candidate's emotional state during a video interview in the booth 100, such as whether the candidate 20 was calm or nervous, or whether the candidate 20 was speaking passionately about a particular subject.

A computer 102 at the booth 100 can capture visual data of the candidate 20 from the cameras 110, capture audio data of the candidate 20 from the microphones 120, and capture behavioral data of the candidate 20 from the depth sensors 130. This data can all be synchronized or aligned. This means, for example, that audio information recorded by all of the microphones 120 can be synchronized with the visual information recorded by all of the cameras 112, 114, 116 and the behavioral data taken from the sensors 130, so that all the data taken at the same time can be identified and compared for the same time segment.

The computer 102 is a computing device that includes a processor for processing computer programming instructions. In most cases, the processor is a CPU, such as the CPU devices created by Intel Corporation (Santa Clara, Calif.), Advanced Micro Devices, Inc. (Santa Clara, Calif.), or a RISC processor produced according to the designs of Arm Holdings PLC (Cambridge, England). Furthermore, computer 102 has memory, which generally takes the form of both temporary, random access memory (RAM) and more permanent storage such a magnetic disk storage, FLASH memory, or another non-transitory (also referred to as permanent) storage medium. The memory and storage (referred to collectively as "memory") contain both programming instructions and data. In practice, both programming and data will be stored permanently on non-transitory storage devices and transferred into RAM when needed for processing or analysis. In some embodiments, the computer 110 may include a graphics processing unit (or GPU) for enhanced processing of visual input and outputs, or an audio processing board, a single chip audio processor, or a digital signal processor (or DSP) that accelerates the processing of audio inputs and outputs.

It should be understood that the receiving, processing, analyzing, and storage of data can take place at the computer 102 in the booth 100 or at a remote server, such as system server 170. Discussion of the steps taken with data can be understood to apply to both the computer 102 and the server 170.

In some embodiments, the computer 102 is tasked with receiving the raw visual data from the cameras, the raw audio data from the microphones, and the raw sensor data from the behavioral depth sensors. The computer 102 is also tasked with making sure that this data is safely stored. The data can be stored locally, or it can be stored remotely. In FIG. 1, the data is stored in database (also referred to as data) 180. This database 180 can include defined database entities that may constitute database tables in a relational database. In other embodiments, these entities constitute database objects or any other type of database entity usable with a computerized database. In the present embodiment, the phrase database entity refers to data records in a database whether comprising a row in a database table, an instantiation of a database object, or any other populated database entity. Data within this database 180 can be "associated" with other data. This association can be implemented in a variety of techniques depending on the technology used to store and manage the database, such as through formal relationships in a relational database or through established relationships between objects in an object-oriented database.

Although this database 180 is shown as being connected to the booth 100 over network 150, the data 182, 184, 186, 188 can be stored locally to the booth 100 and computer 102. To save storage space, audio and video compression formats can be utilized when storing data 180. These can include, but are not limited to, H.264, AVC, MPEG-4 Video, MP3, AAC, ALAC, and Windows Media Audio. Note that many of the video formats encode both visual and audio data. To the extent the microphones 120 are integrated into the cameras, the received audio and video data from a single integrated device can be stored as a single file. However, in some embodiments, audio data is stored separately from the video data. FIG. 1 shows candidate profiles 190. Each candidate profile can include candidate data 186 and a record of whether or not the candidate has been successfully selected for an open position. The candidate data 186 can include defined field data 181, textual data 183, interview data 182, and other data 185. In various embodiments, the interview data 182 can include N-gram data 184. In some embodiments, other data 185 can include ID data for the candidate. In an example, shown in FIGS. 22-24, candidate names can be used to identify the candidate. In other examples, each candidate can be assigned an ID number, such that it is possible to have the candidates listed without names for at least part of the process.

Candidate data can be stored in a candidate profile 190 specific to the candidate. The database 180 can include a plurality of candidate profiles, such as one candidate profile for each candidate. Recorded data, such as data from the cameras 110, the microphones 120, and the sensors 130, can be processed and saved as candidate data in the candidate profile 190. Candidate data can include interview data 182, N-gram data 184, and other candidate data 186 that is recorded data specific to the candidate 20. Alternatively, N-gram data 184 can be stored outside of the candidate profile 190, as shown in FIG. 1. Candidate data can further include textual data such as resume information or personally identifying information. Candidate data can also include data related to the specific open opportunity that the candidate is interested in, such as candidate responses to defined fields discussed in regards to FIG. 5.

The computer 102 is generally responsible for coordinating the various elements of the booth 100. For instance, the computer 102 is able to provide visual instructions or prompts to a candidate 20 through one or more interfaces 140 that are visible to the candidate 20 when using the booth 100. Furthermore, audio instructions can be provided to the candidate 20 either through speakers (not shown) integrated into the booth 100 or through earpieces or headphones (also not shown) worn by the candidate 20. In addition, the computer 102 can be responsible for receiving input data from the user, such as through a touchpad integrated into interface 140.

The system 10 shown in FIG. 1 also includes a user computer system 160 and a system server 170. These elements 160, 170 are also computer systems, so they may take the same form as computer 102 described above. More particularly, these computing systems 160, 170 will each include a processor 162, 172, memory and/or storage 164, 174, and a network interface 168, 178 to allow communications over network 150. The memory 164, 174 is shown in FIG. 1 as containing computer programming 166, 176 that controls the processor 162, 172.

In FIG. 1, the system server 170 is represented as a single computing device. Nonetheless, it is expected that some embodiments will implement the system server 170 over multiple computing devices all operating together through common programming as a single system server 170.

In some embodiments, the user can refer to the decision maker. The user can be presented with the sorted or ordered candidates. The user computer system 160 can take the form of a mobile device such as a smartphone or tablet computer. If the user computer 160 is a standard computer system, it can operate custom application software or browser software 166 that allows it to communicate over the network 150 as part of the system 10. In particular, the programming 166 can at least allow communication with the system server 170 over the network 150. The system 10 can also be designed to allow direct communication between the user's computer system 160 and the booth's computer 102, such as for the real-time connection, or even between the user computer system 160 and data 180. If the user computer 160 is a mobile device, it will operate either a custom app or a browser app 166 that achieves the same communication over network 150.

Note that even though FIG. 1 shows that candidate profiles 190 and opportunity data 188 are found in the same database 180, there is no need for all the data to be physically or logically stored in a single structure. FIG. 1 merely schematically groups data into a single element for ease in understanding the system. Nonetheless, relationships between certain types of data will drive the systems and methods described below, so it will be necessary to analyze and compare much of the data shown with other data.

Database 180 can also contain opportunity data 188 or opening data, such as criteria data. Opportunity data 188 or opening data can include information that is of interest to the candidate or the user. The opportunity data can be relevant to the open opportunity, such as requirements of the user. In the context of an employment search, the opportunity data 188 may containing various attributes and experience requirements for the job opening. The database 180 can further include a data related to the successfully-selected candidates 189, such as a successfully-selected candidate database shown in FIG. 27.

Database 180 can also include N-gram data, such as data that is gathered and manipulated by the system 10. As will be discussed later, the system 10 can use the audio data from a video interview to create N-gram data. This information can be used to help evaluate, sort, or order a candidate within a pool of candidate. Finally, the database 180 maintains other candidate data 186. Other candidate data 186 can include other data about a current candidate or candidate data about previous candidates. Previous candidate data can be used in an N-gram analysis as discussed below.

Referring now to FIG. 2, an additional schematic view of the system 10 is shown in accordance with various embodiments herein. FIG. 2 shows the user computer system 160, the system server 170, and the database 180 can all be connected to one or more booths 100 and/or one or more candidate computing devices 104, 108. The candidate computing devices 104, 108 can replace the booth 100 and the booth computer 102, when a candidate is providing data to the system 10 through a personal computer or mobile device. The multiple different booths 100 and candidate computing devices 104, 108 illustrates that multiple candidates can apply for and/or provide candidate data in regards to a common open opportunity.

Figure 3:
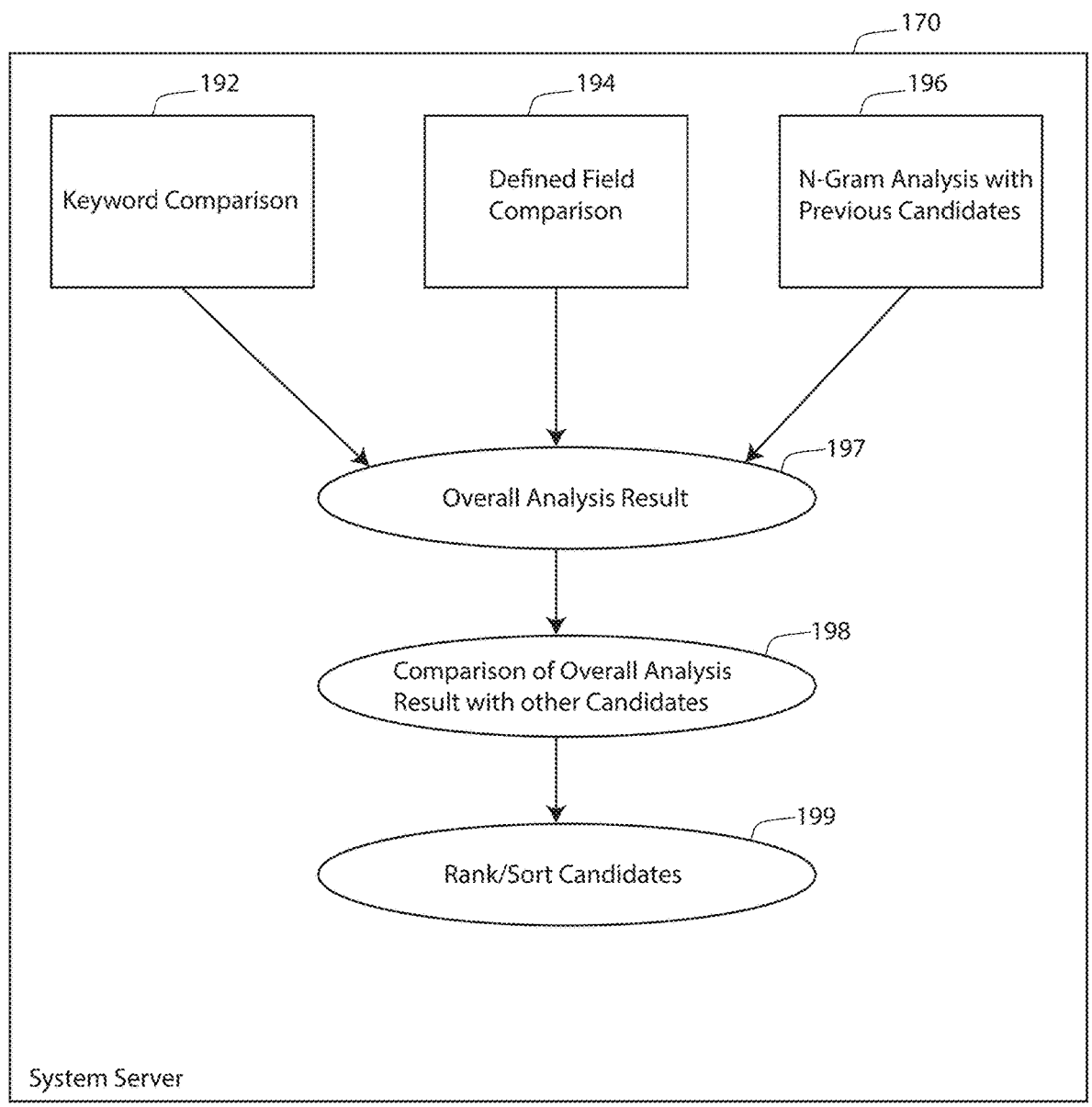
FIG. 3 is a schematic of various portions of analyzing candidates and the resulting steps of the searching system in accordance with various embodiments herein.

Referring now to FIG. 3, a schematic view of different analysis components that can be included in a ranking or sorting system 10 of a candidate is shown. In some embodiments, candidate analysis results include an overall analysis result 197. The overall analysis result 197 can include a keyword comparison 192, a defined field comparison 194, and an N-gram analysis 196 for each candidate. The results of the overall analysis result can be compared with other candidates 198. The candidates can be ranked or sorted based on their overall analysis results 199.

The keyword comparison 192 can also be referred to as a first analysis result. The keyword comparison 192 can include a comparison between textual data from the user and textual data from the candidate as discussed in regards to FIG. 4.

Figure 5:
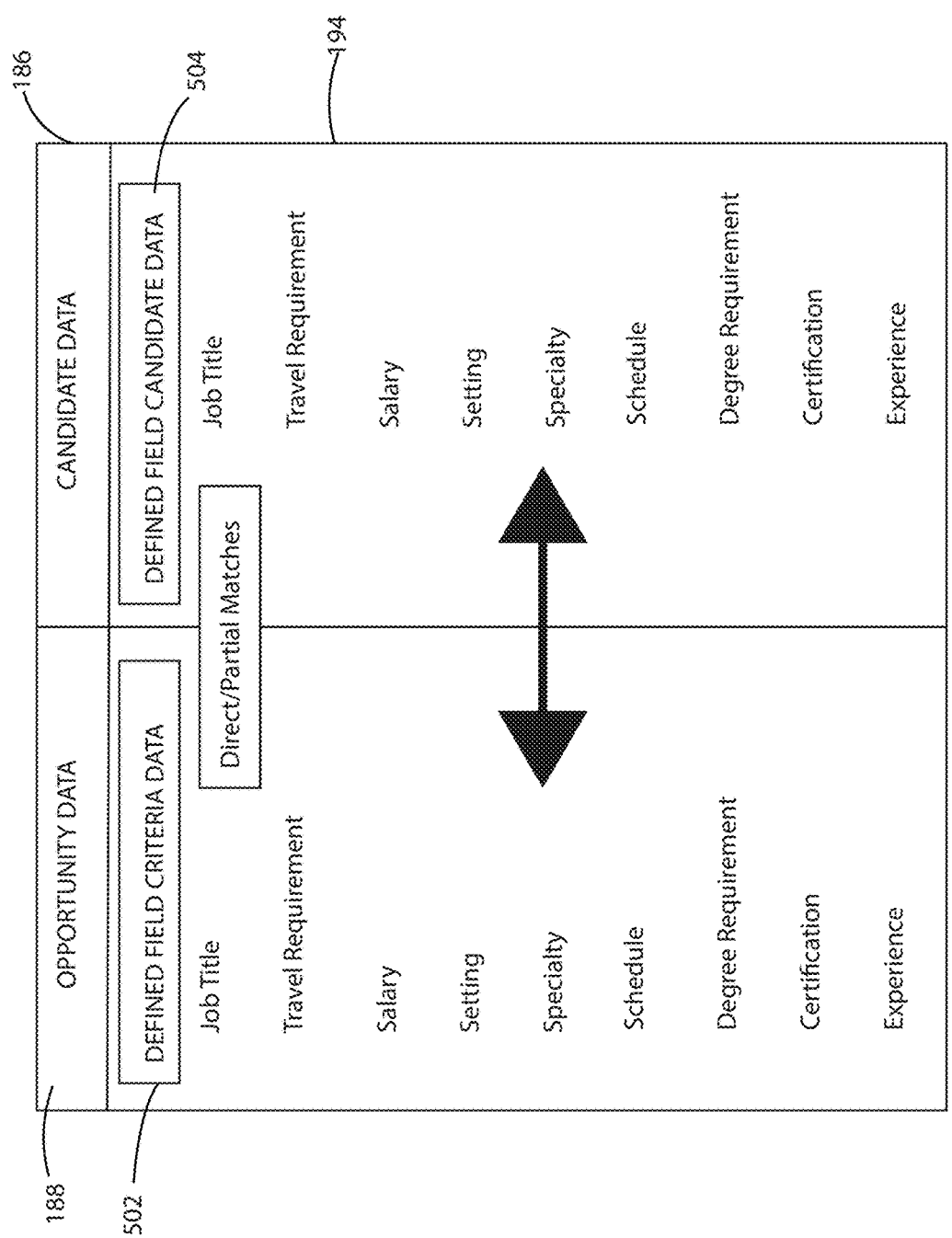
FIG. 5 is a schematic of a defined field comparison between the opportunity data and the candidate data in accordance with various embodiments herein.

The defined field comparison 194 can include a direct comparison between defined fields in the criteria data and defined fields in the candidate data such as discussed in regards to FIG. 5. The defined field comparison 194 results in a defined field analysis result.

The N-gram analysis 196 can include a comparison between audio data from the candidate and audio data from previously successfully-selected candidates as discussed in FIGS. 6-22. The N-gram analysis 196 results in an N-gram analysis result.

The components included in the overall analysis result 197 can be weighted to provide a desired emphasis on a portion or on portions of the evaluation. In various embodiments, the overall analysis result 197 of the candidate can include weighting one or more of the keyword comparison 192, the defined field comparison 194, and the N-gram analysis 196. In some embodiments, the keyword comparison 192 (first analysis) result can be weighted more heavily than the defined field comparison 194 and the N-gram analysis 196, and the defined field comparison 194 can be weighed more heavily than the N-gram analysis 196. In an example, the keyword comparison 192 can be weighted to 70% of the overall analysis result 197, the defined field comparison 194 can be weighted at 20%, and the N-gram analysis 196 can be weighted at 10%.

Figure 4:
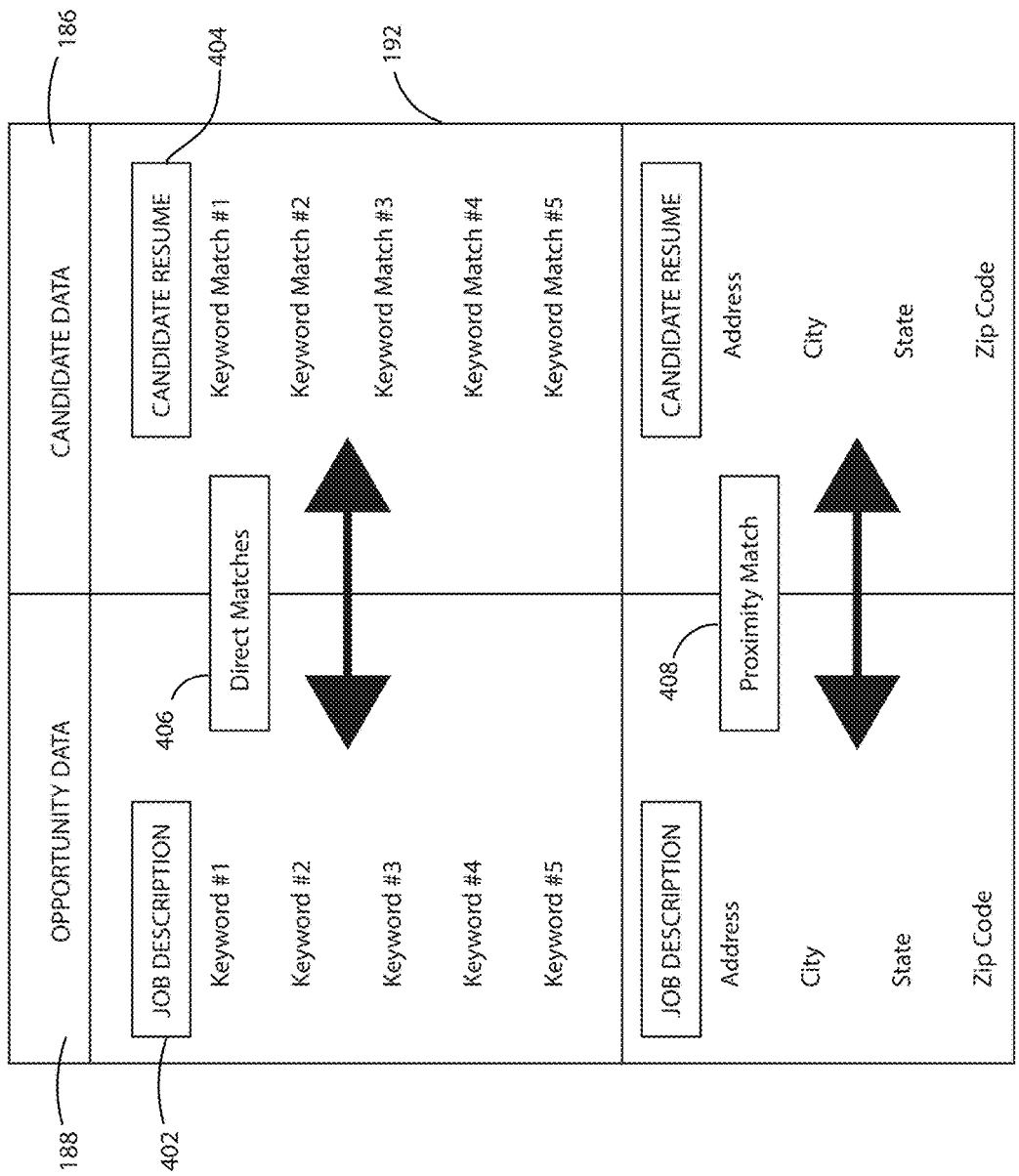
FIG. 4 is a schematic of a keyword comparison between the opportunity data and candidate data in accordance with various embodiments herein.

Keyword Comparison (FIG. 4)

FIG. 4 shows a schematic of the keyword comparison 192, also referred to as the first analysis, in accordance with various embodiments herein. The keyword comparison 192 can include a comparison of opportunity data 188 with candidate data 186. The user can provide textual criteria data 402 to the system. In an employment example, the textual criteria data 402 can include a job description. In some embodiments, the textual criteria data 402 can include a selection of a number of keywords. In an employment example, the user could select keywords such as "motivated" and "energetic." In some embodiments, the keywords can be selected from a predefined list or pool of words. For example, the user can choose at least five keywords from a pool of keywords to be searched for or compared with the textual candidate data 404.

In various embodiments, the candidate can provide textual candidate data 404 to the system. In an employment example, the textual candidate data 404 can include a resume and/or a cover letter. The textual criteria data 402 can be compared with the textual candidate data 404 to determine the number of direct matches 406. It should be understood that the more matches between the textual criteria data 402 and the textual candidate data 404 the more likely the candidate is a good fit for the open opportunity.

In some embodiments, the keyword comparison 192 can include a distance analysis or proximity match 408. In some instances, it can be that the closer a candidate is to the geographical location of the opportunity, the better the fit can be. In some embodiments, the system can review the textual criteria data 402 to determine the location of the open opportunity. The system can further review the textual candidate data 404 to determine the location of the candidate. A distance analysis between the geographical data in the criteria data and the geographical data in the candidate data can be performed. In some embodiments, the keyword comparison can incorporate the distance analysis into the keyword comparison result.

In an example of a keyword comparison, a user, such as an employer, while providing opportunity data can select at least five main keywords to use in the comparison. In some examples, the system can scan through textual criteria data, such as a job description, and look for keywords that match a keywords database maintained on the system server 170 or database 180. The system can determine the presence of the keywords in the textual candidate data 404. In an example, each keyword can be worth 15 points or 15% for a total of 75 points or 75%. If a candidate matches all five keywords, the candidate can get 75 points or 75%. Similarly, if a candidate only matches three keywords, the candidate can get 45 points or 45%. The distance analysis can provide the remaining 25 points or 25%. For example, candidates that are located within 15-mile radius can receive 25 points or 25%. The points and percentage can decrease as the candidate's location increases. For example, one point or 1% can be subtracted from the total 25 points or 25% for each mile the candidate is located outside of the 15-mile radius. As an example, a candidate that lives 25 miles away can get 15 points or 15%.

Defined Field Comparison (FIG. 5)

After the candidate provide textual data, the candidate can provide additional data, such as defined field candidate data. The system can update the candidate's evaluation as additional candidate data is provided. FIG. 5 shows a schematic of a defined field comparison 194 in accordance with various embodiments herein. The user can provide defined field criteria data 502. Defined field criteria data 502 can be objective data that the user desires in a candidate. In an employment example, the defined fields can include job title, travel requirement, salary, setting, specialty, schedule, degree requirements, certification(s), license(s), and experience. These defined fields can have specific objective requirements (defined field criteria data) specified by the user as requirements of the opportunity. As part of the system gathering candidate data, the candidate can respond to the defined fields with defined field candidate data 504. Comparing the defined field criteria data 502 with the defined field candidate data 504 can provide a defined field analysis result for the candidate data.

In some embodiments, the defined field criteria data comprises data for a first defined field and a second defined field. The defined field candidate data can also include data for a first defined field and a second defined field. The criteria data for the first field can be compared to the candidate data for the first field to determine if the candidate data achieves the criteria data. Similarly, the criteria data for the second field can be compared to the candidate data for the second field. The results of comparing each field of the criteria data to each field of the candidate data can be compiled into a single defined field analysis result.

Figure 6:
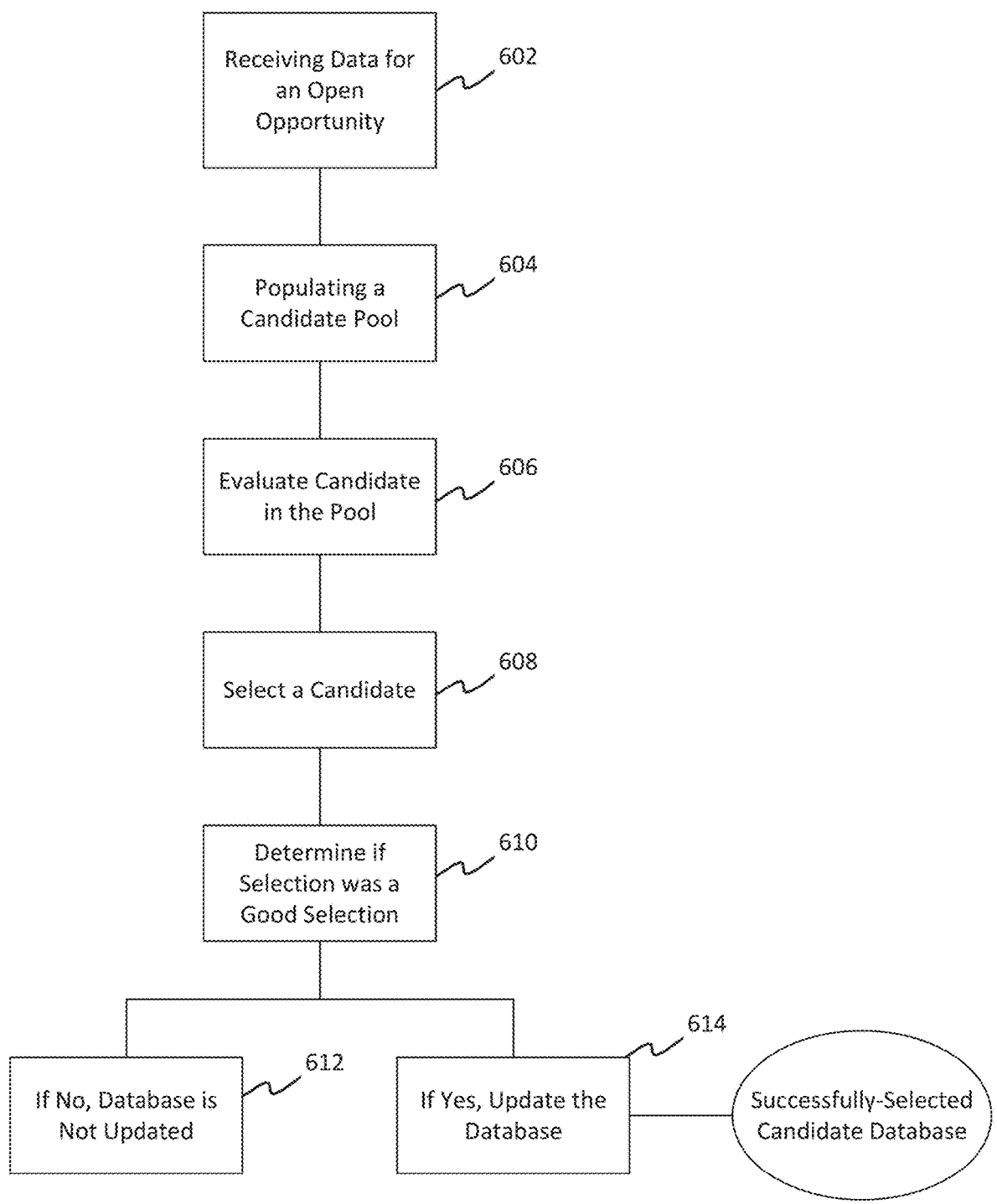
FIG. 6 is a flowchart of populating a database in accordance with various embodiments herein.

Populating the Candidate Database (FIG. 6)

FIG. 6 shows a flowchart of populating a successfully-selected candidate database in accordance with various embodiments herein.

In an embodiment, the method for populating the successfully-selected candidate database can include receiving data for an open opportunity 602. The received data can relate to the open opportunity. The received data can be criteria data. In the employment example, the data related to the open opportunity can include a job description and requirements for potential candidates.

After receiving the data for the open opportunity, the method can include populating a candidate pool for the open opportunity 604. In some embodiments, the method can search through an already existing candidate pool and narrow the existing candidate pool to candidates that would meet the criteria data from the user. In some embodiments, the method can accept requests from candidates that are interested in the open opportunity and populate the candidate pool with the requesting candidates. In some examples, each of the candidates in the pool have recorded a video interview, such as the candidate responding verbally to a series of prompts or questions. The video interview can be saved in a candidate profile specific to the candidate.

The candidates can be evaluated 606 to determine which candidate will be selected. In evaluating the candidates, the system can review or analyze candidate data for each candidate. A candidate can be selected 608. In an employment example, the selected candidate can be hired.

After the candidate is selected, it can be determined if the candidate was good selection 610. In some embodiments, a time period can pass and then the user can respond to the system either confirming that the selected candidate was a good selection or that the selected candidate is still employed. Alternatively, the user can respond that the candidate was not a good selection or is no longer employed. In some embodiments, it can be assumed that all selected candidates are good selections.

If the candidate is not a good selection, the successfully-selected candidate database is not update 612. In some embodiments, if the candidate is a good selection, the successfully-selected candidate data can be updated 614 to include the selected candidate's candidate data. In some embodiments, if the candidate is a good selection, the candidate's profile is updated to reflect that the candidate is a successfully-selected candidate. In various embodiments, a transcript of or the audio data of the candidate's video interview is saved in the successfully-selected candidate database. This database of video interview data from successfully-selected candidates can be used in future selection processes as described in FIG. 7.

Figure 7:
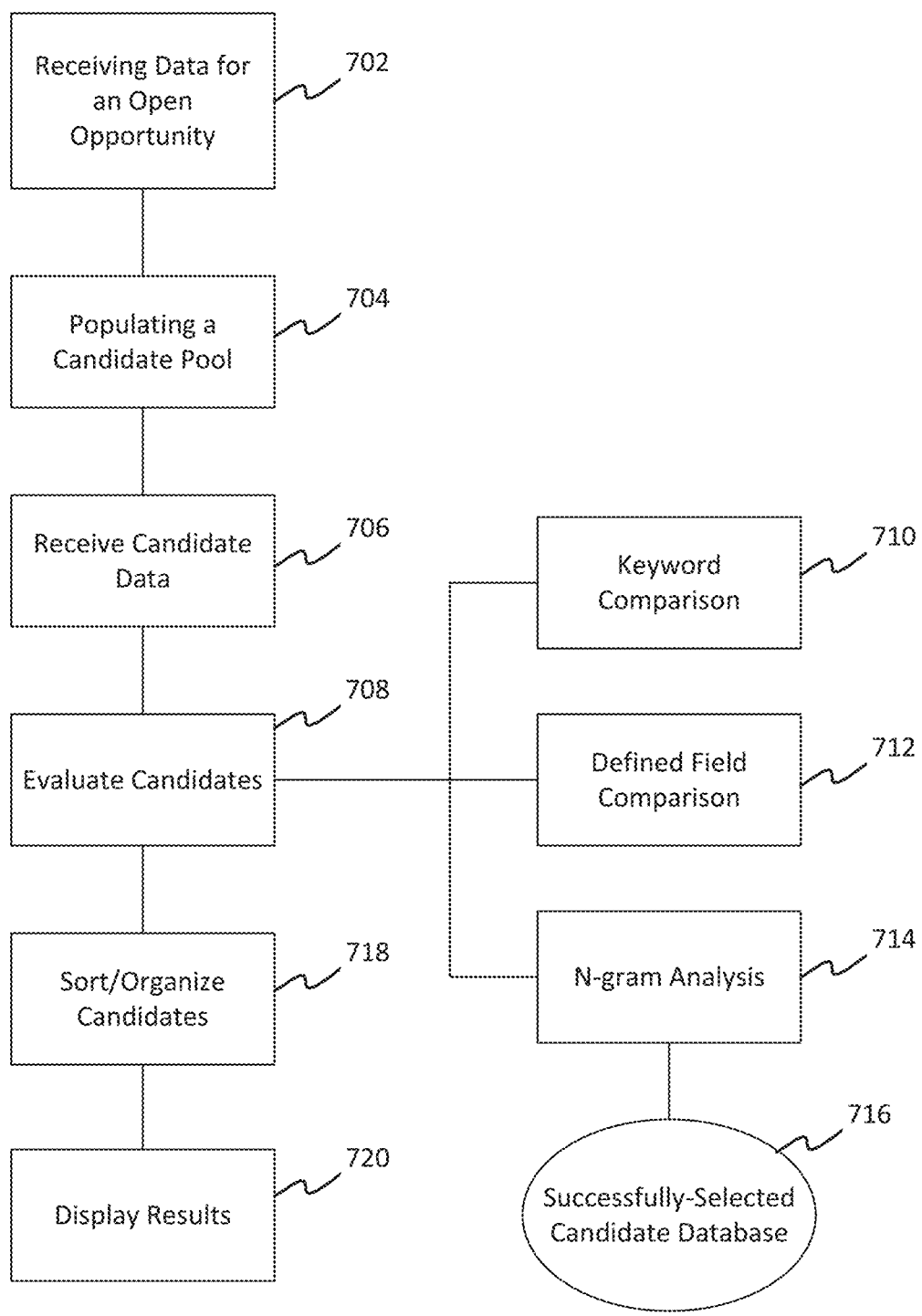
FIG. 7 is a flowchart of a searching process in accordance with various embodiments herein.

Evaluation Using Successfully-Selected Candidate Database (FIG. 7)

FIG. 7 shows a flowchart depicting a method of sorting candidates based on an evaluation using a successfully-selected candidate database in accordance with various embodiments herein.

The method can include receiving criteria data 702. In various embodiments, the criteria data can be received at a non-transitory computer memory, such as a portion of the system server. The criteria data received from the user can include textual criteria data, and defined field criteria data. As discussed above, the defined field criteria data can include first defined field criteria data and second defined field criteria data. In some embodiments, the criteria data can include a opportunity code that aligns with a successfully-selected candidate database for open opportunities with the same opportunity code. For example, if the system is being used to sort candidates for a nursing position, the system can access a successfully-selected candidate database for previous nursing positions. In some embodiments, the system can have very nuanced opportunity types, such as a nursing manager for a large hospital or an emergency room nurse for a rural hospital.

The method can include populating a candidate pool 704. In some embodiments, the method can search through an already existing candidate pool and narrow the existing candidate pool to candidates that would meet the criteria data from the user. In some embodiments, the method can accept requests from candidates that are interested in the open opportunity and populate the candidate pool with the requesting candidates. The method can further include receiving candidate data 706. Each candidate can have candidate data stored in a candidate profile on the database, as shown in FIG. 1. In some examples, each of the candidates in the pool can have recorded a video interview, such as the candidate responding to a series of prompts or questions. A recording of the video interview can also be referred to herein as a video resume. The video interview can be saved in a candidate profile specific to the candidate. In other embodiments, not all of the candidates will have a video interview stored in his/her candidate profile. The system can receive and store candidate data for each of the candidates. The candidate data can include textual candidate data, defined field candidate data (e.g. first defined field candidate and second defined field candidate data), and audio data of the video interview. The audio data can include a plurality of portions. Each portion can be a response to a prompt as will be discussed below in FIGS. 8-10.

The system can analyze or evaluate each candidate 708. The evaluation can include one or more of the following portions (1) keyword comparison 710, (2) defined field comparison 712, and (3) N-gram analysis 714 with a successfully-selected candidate database 716. The keyword comparison was discussed above in FIG. 4, among other locations herein. The defined field comparison was discussed above in FIG. 5, among other locations herein. The N-gram analysis will be discussed below in FIGS. 8-22. After evaluating each of the candidates in the candidate pool, the candidates can be sorted or organized 718 based on their evaluations. The method can further include displaying the results of the sorting/organizing to a user 720.

N-Gram Analysis (FIGS. 8-22)

Video Interview

In various embodiments, the candidate data can include an audio recording or an audio and video recording of a video interview, also referred to as a video resume. The video interview can include a series of candidate responses to prompts. In some embodiments, the video interview can be recorded in a booth (as shown in FIG. 1). In other embodiments, the video interview can be recorded by a candidate computing device (as shown in FIG. 2).

In some embodiments, the series of prompts that are presented to each candidate can be the same for different open opportunities of the same type. Similarly, each candidate for a specific open opportunity can be provided the same set of prompts. For example, the same prompts can be used for all open opportunities in health care positions. In other embodiments, the series of prompts is used only for candidates of more similar open opportunities. For example, the prompts to potential candidates for a current nursing position can be the same prompts as previous potential candidates responded to for a previous nursing position, such as a triage nurse position, a medical/surgical floor nurse position, an emergency room nurse position, or a nurse manager position.

In an embodiment, the number of prompts can be at least three and not more than fifteen. In an example, there can be three prompts total. In an example, there can be four prompts total. In an example, there can be five prompts total. In an example, there can be six prompts total. In an example, there can be seven prompts total. In an example, there can be eight prompts total. In an example, there can be nine prompts total. In an example, there can be ten prompts total. In an example, there can be eleven prompts total. In an example, there can be twelve prompts total. In an example, there can be thirteen prompts total. In an example, there can be fourteen prompts total. In an example, there can be fifteen prompts total.

Figure 8:
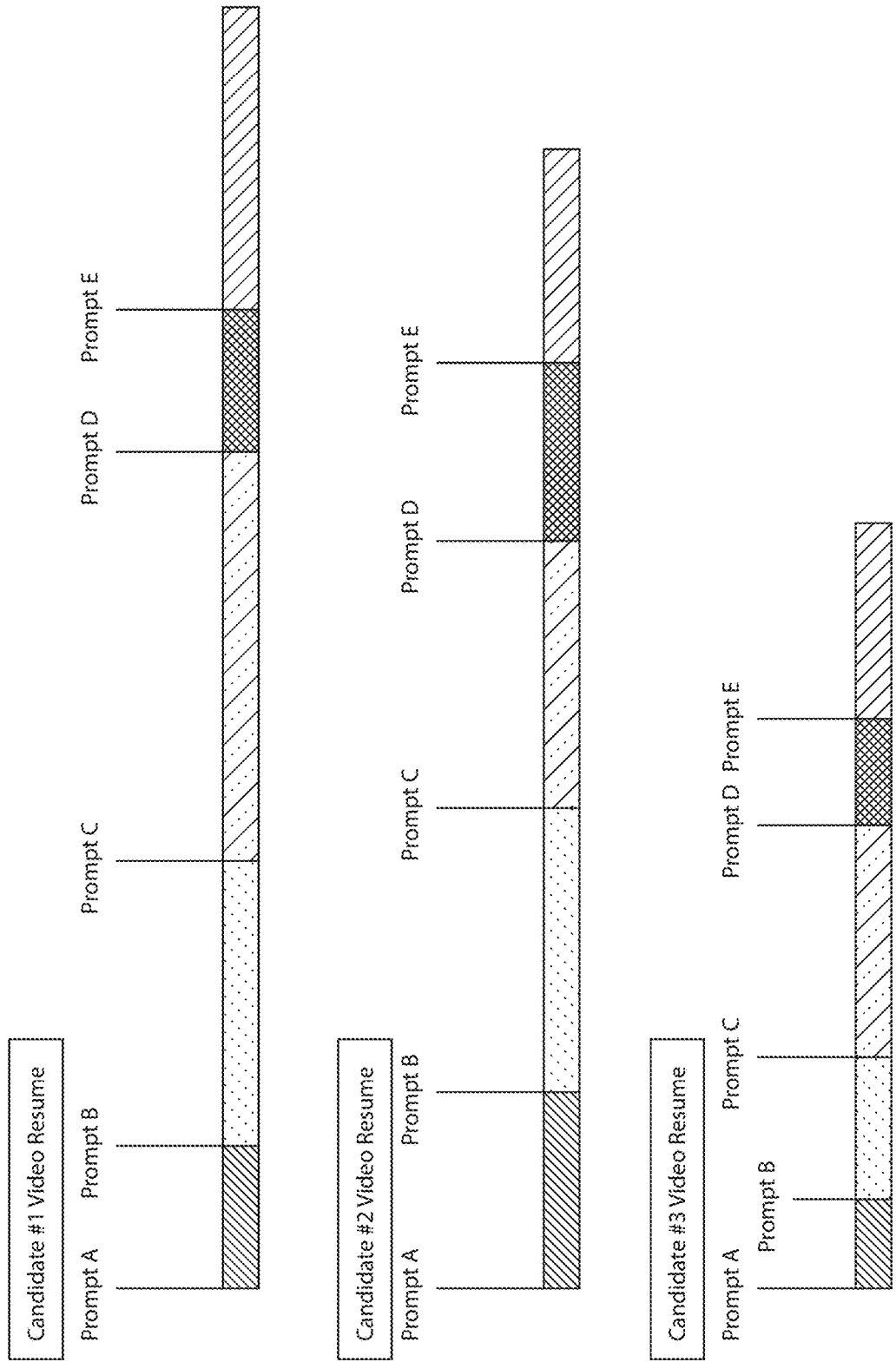
FIG. 8 is a schematic of various candidate data recordings in accordance with various embodiments herein.

FIG. 8 shows a schematic of audio data of three candidates (candidate #1, candidate #2, candidate #3) that have responded to the same five prompts (prompt A, prompt B, prompt C, prompt D, and prompt E). It can be seen from comparing the responses to each of the prompts, that different candidates have responses of varying lengths. For example, FIG. 8 shows candidate #2 with the longest response to prompt A and candidate #3 with the shortest response to prompt B. The audio data can be separated into various portions, such as one portion for each prompt.

Figure 9:
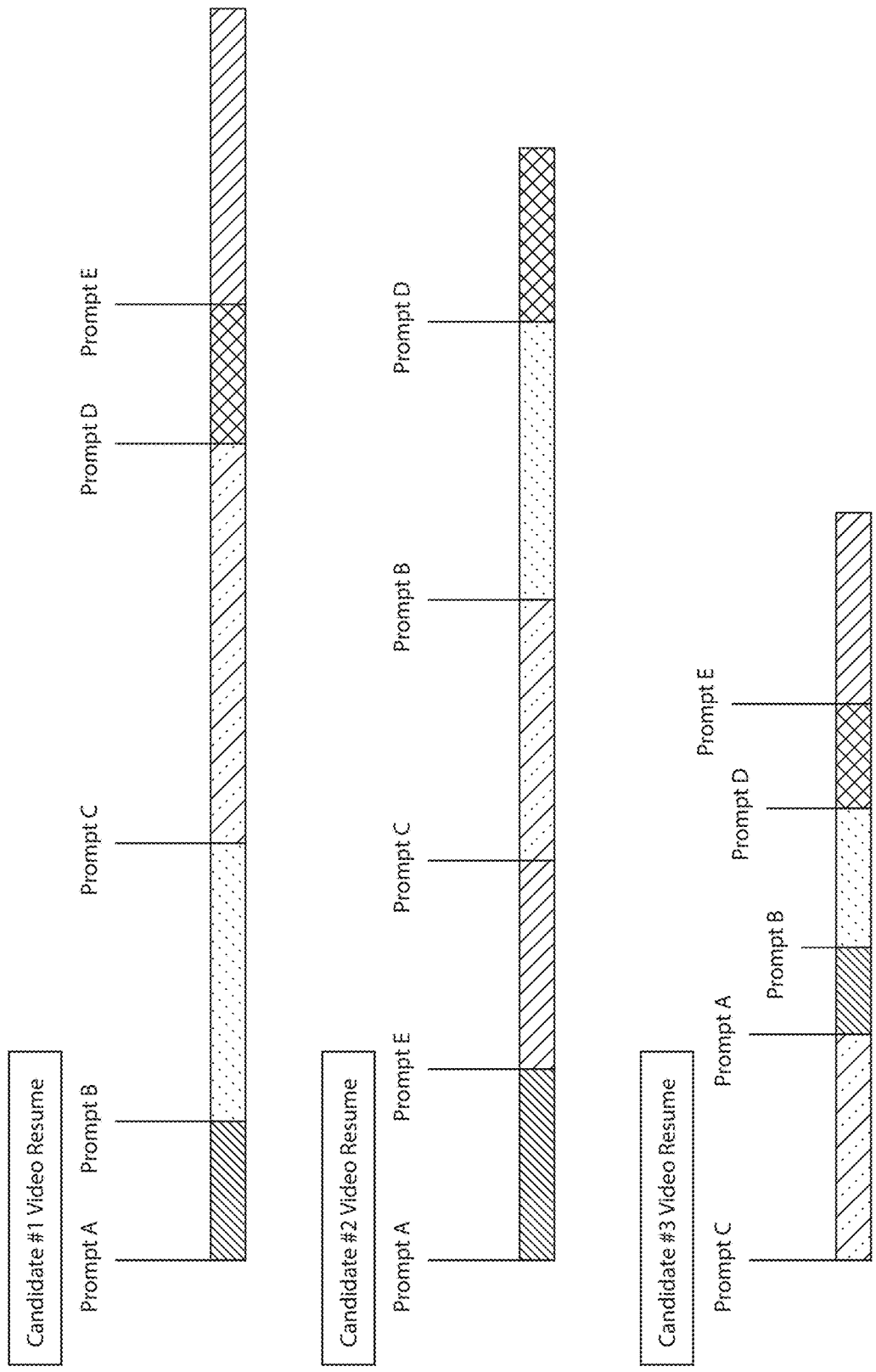
FIG. 9 is a schematic of various candidate data recordings in accordance with various embodiments herein.

FIG. 9 shows a schematic of audio data of three candidates similar to FIG. 8. FIG. 9 shows that the responses to the prompts can be recorded in different orders. In some embodiments, the candidate can choose to record his/her responses in a different order. In some embodiments, a candidate can skip a prompt. The candidate can return to the skipped prompt and respond to it at a later time, such as after responding to the other prompts.

In some embodiments, a candidate can be unhappy with his/her response to a prompt and opt to rerecord the response to that prompt. For example, candidate #3 might have only been pleased with his/her response to prompt C, and opted to rerecord the responses to prompts A, B, D, and E, which could explain why prompt C comes before the responses to prompts A, B, D, and E. In some embodiments, the system can automatically replace previous responses when a subsequent response to the same prompt is recorded. In other embodiments, the system allows the candidate the option of which response to the prompt should be retained for their video interview. In other embodiments, the system can recommend the candidate retain a specific version of their response, such as based on the N-gram analysis of both responses.

In another embodiment, candidate #3 might have skipped prompt A and prompt B. Candidate #3 then might have answered prompt C. After responding to prompt C, candidate #3 might have answered prompts A, B, D, and E in order.

FIG. 10 shows a schematic of the three candidates' audio data being separated into portions and arranged to illustrate that responses to the same prompts are compared to each other. In various embodiments, the audio data of each candidate can be separated into portions, such as one portion for each response to a prompt. Each of the candidates' responses to the same prompt can be compared. In various embodiments, candidate #1 and candidate #2 are successfully-selected candidates and candidate #3 is a current candidate.

It should be understood that "same prompt" can refer to different prompts that are related or similar, such as intending to capture the same subject matter. "Same prompts" can be slightly different, such that an update prompt can include updated vocabulary or rewording of a previous prompt, but still be considered the "same." For example, prompts can be updated to account for societal shifts in language. The data that was recorded and maintained to the original (non-updated) prompt can still be quite relevant and still be used in the comparison, when a current candidate has responded to the updated prompt.

In an embodiment, each prompt can be assigned a specific code. The specific code can be used to identify which prompts (when updating has occurred) should be compared to each other. For example, a first iteration of a first prompt could include "What do you do in a stressful work situation?". A second iteration of the first prompt could include "How do you handle stressful work situations?". While these two prompts are not identical the data from the first iteration of the prompt can still be very relevant to the responses to the second iteration of the prompt. As such, the original prompt and the revised prompt can be given the same code, such that the stored responses to the original prompt can be used in a comparison with responses to the revised prompt.

N-Gram Creation

The audio data from the video interview can be used for the N-gram analysis. The audio data can be converted into a text-based transcript. The conversion from audio data to text-based transcript can be performed by one of the known conventionally used speech to text programs that are currently available.

Figure 11:
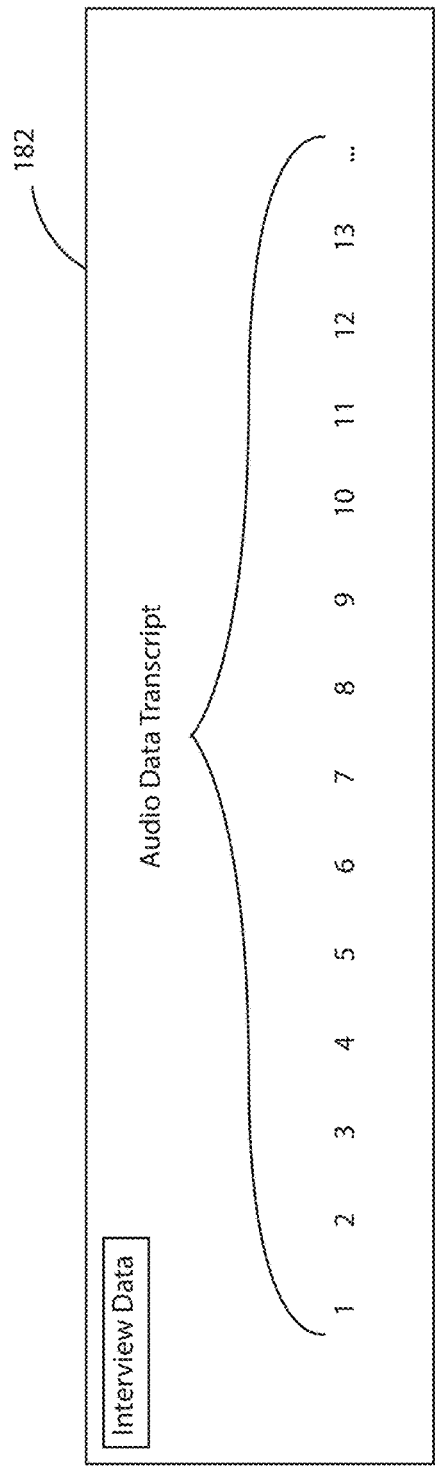
FIG. 11 is a schematic of a transcript of audio data in accordance with various embodiments herein.
Figure 12:
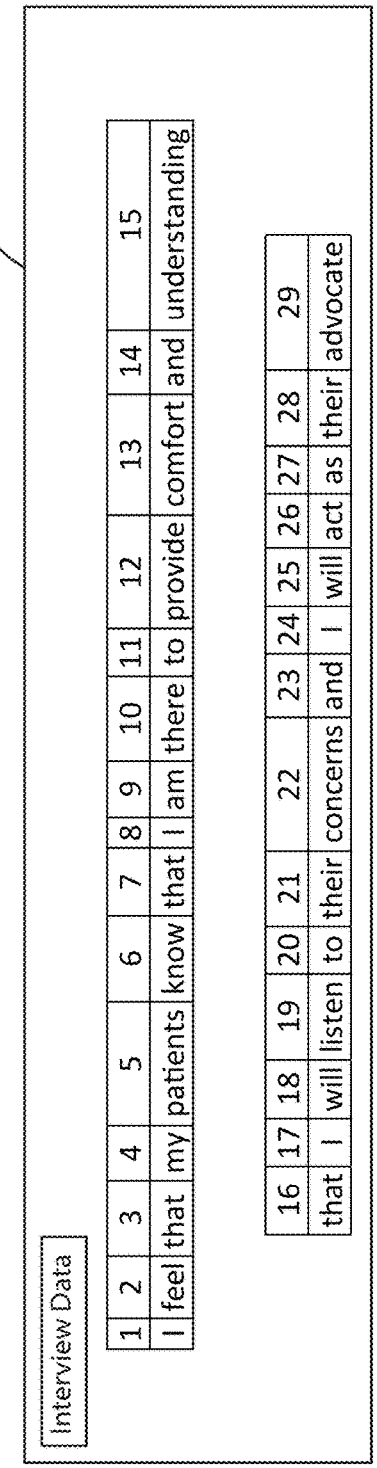
FIG. 12 is a schematic of a transcript of audio data in accordance with various embodiments herein.

FIG. 11 shows a schematic of a transcript for discussion purposes. Each number represents a word. FIG. 12 shows an example of a portion of the audio data transformed into a text-based transcript. In the interview data shown in FIG. 12, the transcript of the audio data states, "I feel that my patients know that I am there to provide comfort and understanding that I will listen to their concerns and I will act as their advocate."

Figure 13:
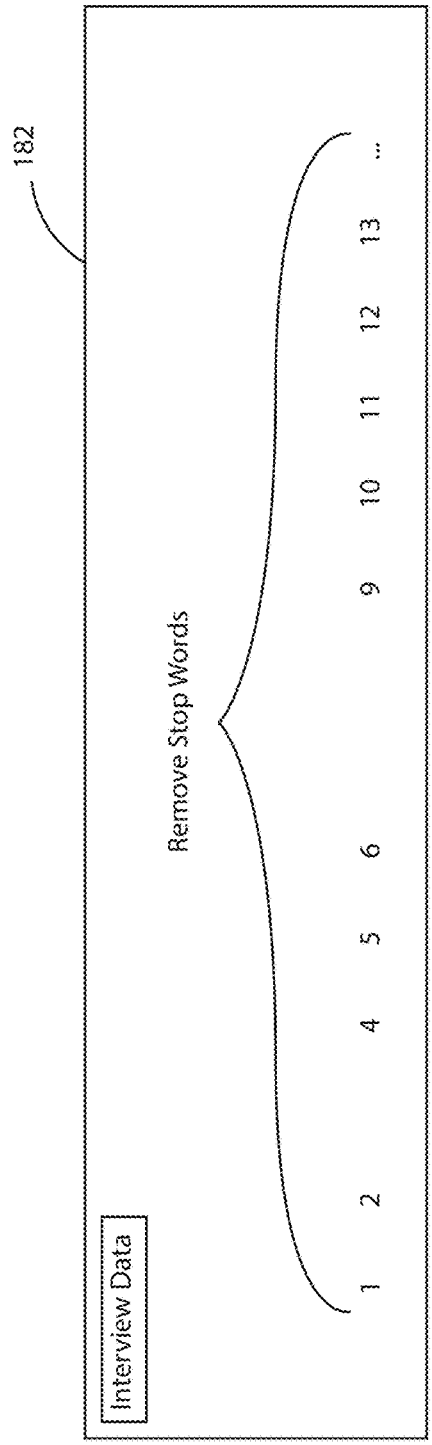
FIG. 13 is a schematic of a modified transcript of audio data in accordance with various embodiments herein.

The text-based transcript of the video interview or a portion of the video interview can be modified to remove stop words. Stop words can include commonly used words that provide very little useful information when determining the content of text-based transcript. Examples of common stop words include "a," "that," "as," "and," "my," and "to". FIG. 13 shows that the third word, the seventh word, and the eighth word were stop words and removed as can be seen when comparing FIG. 13 with FIG. 11. Similarly, FIG. 14 shows various stop words have been removed from transcript as can be seen when comparing FIG. 14 with FIG. 12.

Figure 14:
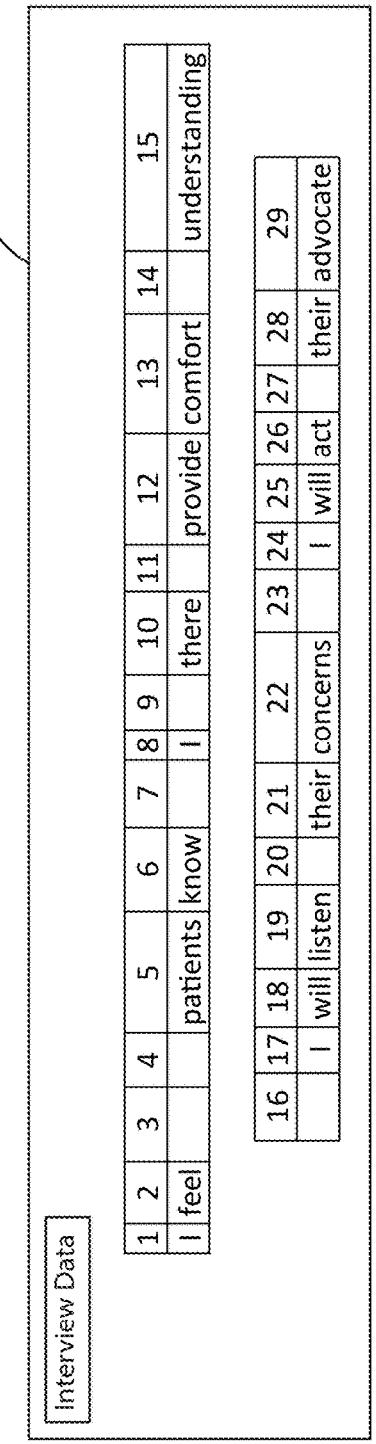
FIG. 14 is a schematic of a modified transcript of audio data in accordance with various embodiments herein.

Once the stop words are removed, a cleaned transcript of the audio data exists, shown in FIGS. 13 and 14. The cleaned transcript can be used to create N-grams. As discussed above, an N-gram is a series of words that are grouped together. "N" can refer to the number of words in the group. In an embodiment, when the N-grams are first created, all of the N-grams have an equal number of words.

Figure 15:
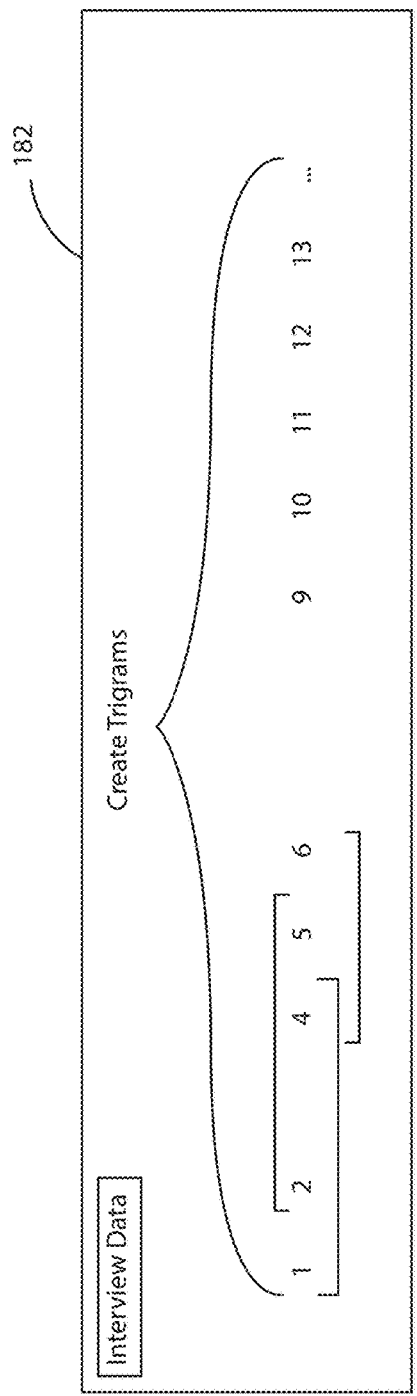
FIG. 15 is a schematic of a modified transcript of audio data in accordance with various embodiments herein.
Figure 16:
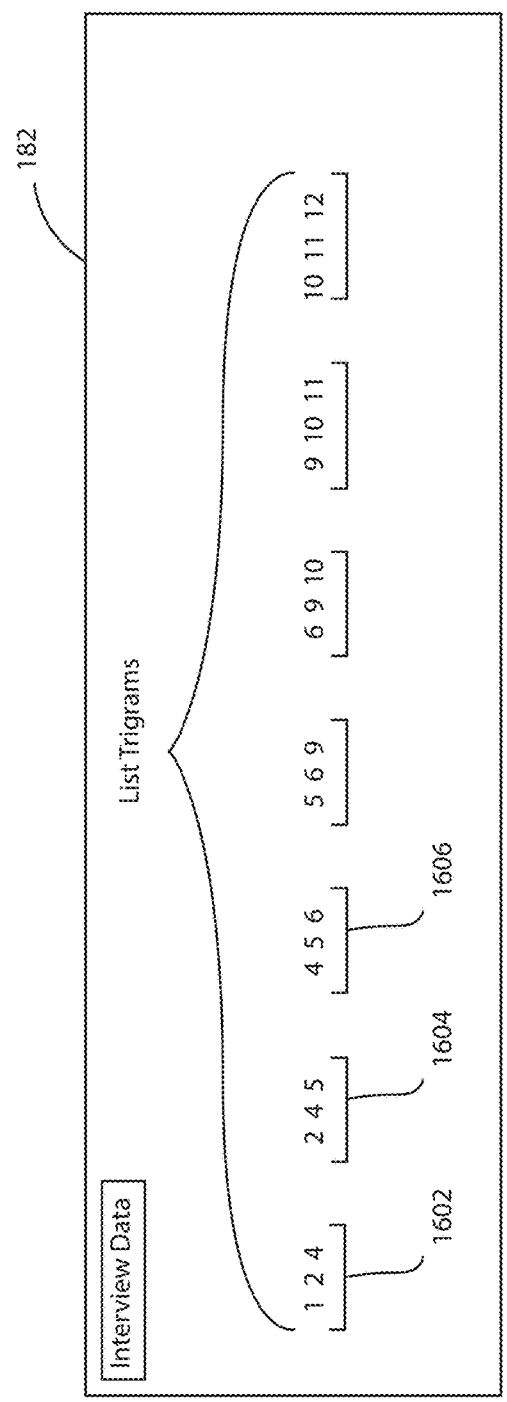
FIG. 16 is a schematic of a modified transcript of audio data in accordance with various embodiments herein.
Figure 17:
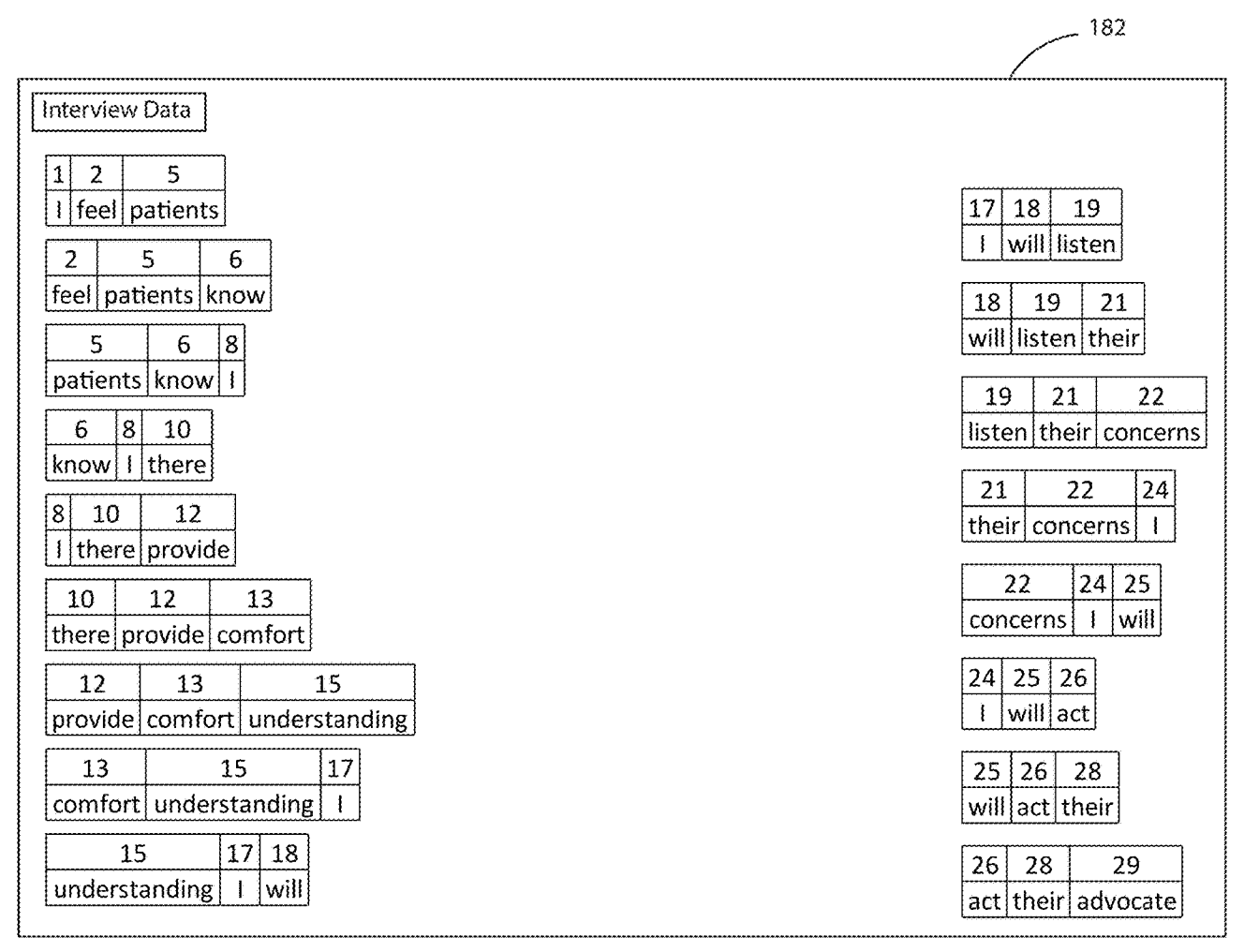

FIG. 15 shows trigrams being created. Each of the trigrams includes three consecutive words. Many of the words (other than the first two and the last two) will be part of three trigrams. As shown in FIG. 16, where a list of the trigrams created is shown, it can be seen that word #4 is in three trigrams 1602, 1604, 1606. FIG. 17 shows a list of the trigrams created from the cleaned transcript shown in FIG. 14. The interview data 182 shown in FIG. 17 includes the following trigrams: "I feel patients," "feel patients know," and "patients know I." Additional trigrams are also shown in FIG. 17.

In some embodiments, after the N-grams are created, low value words can be removed. Low value words are additional words that do not provide significant context or contributions to the overall understanding of the data. In some examples, low value words can refer to words that are not nouns, adjectives, verbs, and adverbs. In some embodiments, after removing low value words only nouns, adjectives, verbs, and adverbs remain in the N-grams. Removing low value words from an N-gram data set can provide an N-gram data set that includes N-grams of different sizes.

Figure 18:
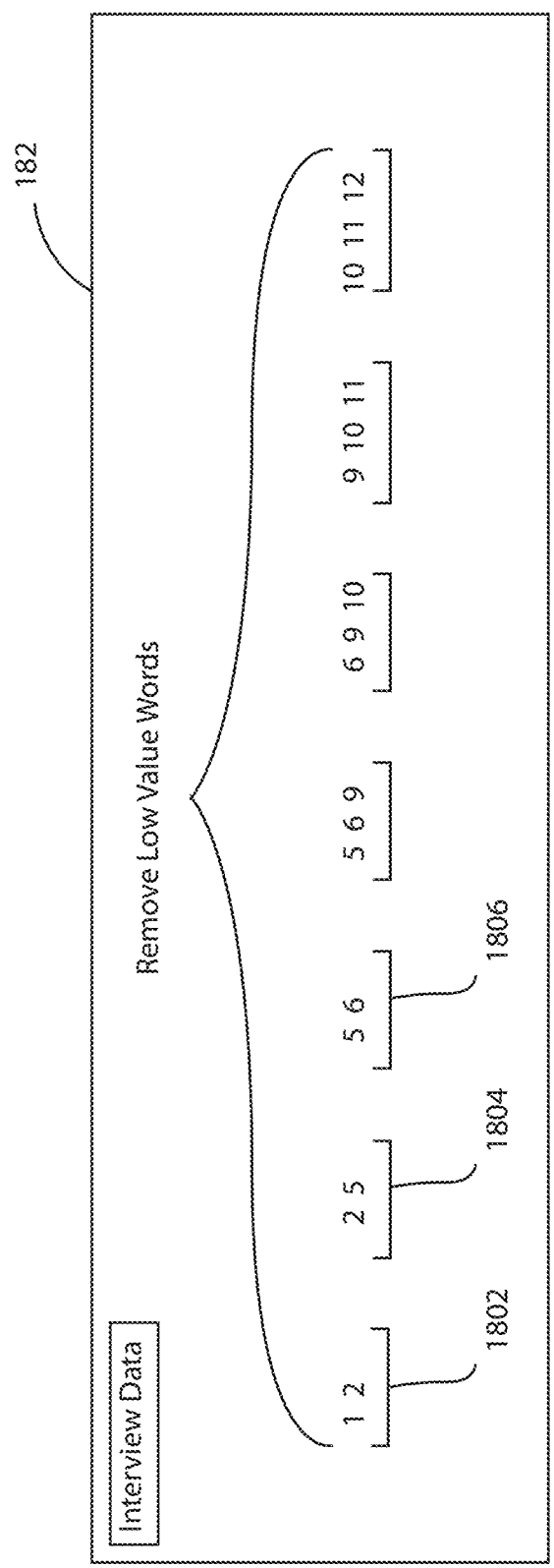
FIG. 18 is a schematic of a modified transcript of audio data in accordance with various embodiments herein.
Figure 19:
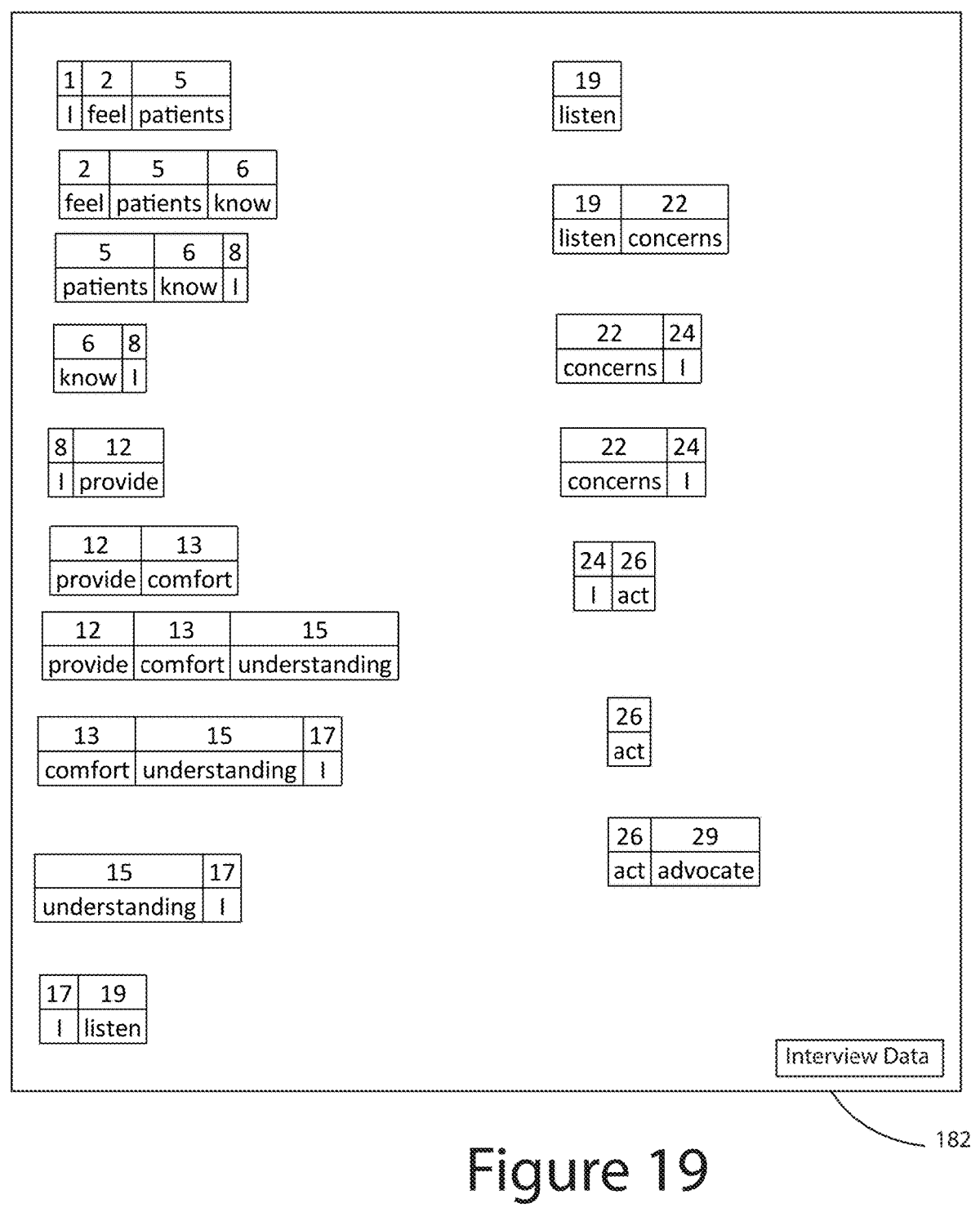

Prior to removing the low value words, all of the N-grams shown in FIGS. 16 and 17 were trigrams, because they all included three words. In this example, N has an initial value of three at the stage of the analysis before low value words are removed. After removing the low value words from the N-gram data set, the various N-grams can each include N or less words. FIG. 18 shows that word #4 was a low value word, as a result N-grams 1802, 1804, 1806 only include two words, whereas the remaining N-grams all include three words. Similarly, FIG. 19 shows the low value words removed from the N-gram data set in FIG. 17 to result in an N-gram data set that includes trigrams, bigrams, and single words.

Figure 20:
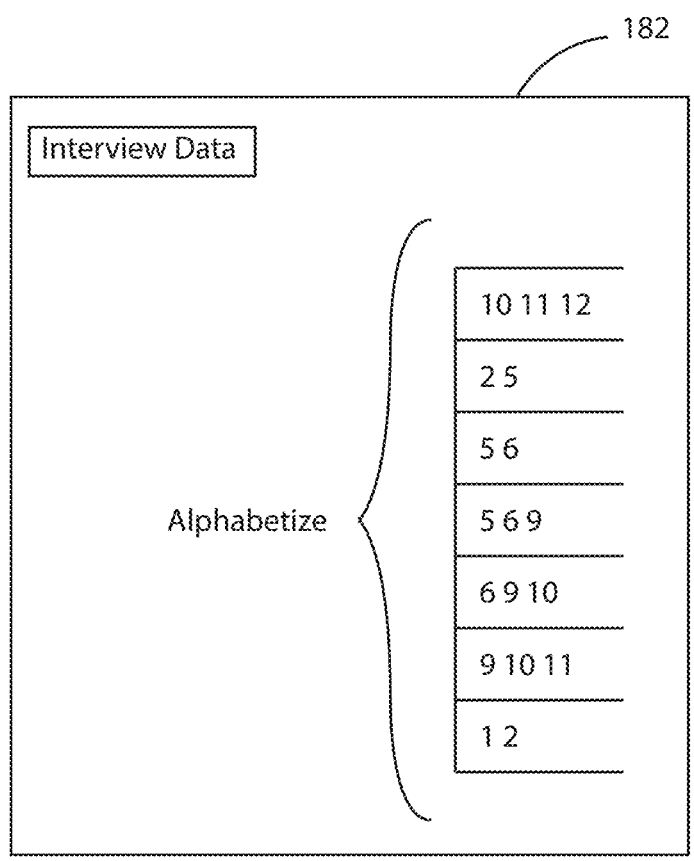
FIG. 20 is a schematic of N-grams of audio data in accordance with various embodiments herein.

In some embodiments, to aid in processing speeds, the list of N-grams can be alphabetized. The alphabetized list of N-grams can come from the N-gram data set shown in FIGS. 16 and 17 (prior to removal of the low value words) or the N-gram data set shown in FIGS. 18 and 19 (after removal of the low value words). FIG. 20 shows an alphabetized list of N-grams from the N-gram data set shown in FIG. 18. FIG. 21 shows an alphabetized list of N-grams from the N-gram data set shown in FIG. 19.

After the N-gram data set is completed, the N-gram data set can be compared to the database of N-grams. The database of N-grams can be populated from the video interview (audio data) from previous candidates that were selected for a similar open opportunity. FIG. 22 shows the current candidate's list of N-grams (from FIG. 20) being compared to all of the N-grams in the database of the successfully-selected candidates.

It can be determined that candidates that have a high similarity rate with the databased of successfully-selected candidates compared to other current candidates are potentially a better fit for the current open opportunity, since they responded to the prompts in the video interview in more similar ways to previous candidates that were selected. In some embodiments, a percentage of candidate N-grams that match with the database of N-grams can be used, such as to normalize the data for the candidates regardless of how verbose he/she is in their responses to the prompts. As shown in TABLE 1 below, Candidate #1 matches more N-grams with the successfully-selected candidate N-grams than Candidate #2. However, that does not always equate to Candidate #1 being more similar to the successfully selected candidates. Candidate #2 has a higher percentage of matched N-grams. Table 1 shows Candidate #1 recorded a much wordier response than Candidate #2. In some embodiments, Candidate #1 can score more highly than Candidate #2, because Candidate #1 had more matched N-grams. In other embodiments, Candidate #2 can score more highly than Candidate #1, because Candidate #2 had a higher percentage of matched N-grams.

TABLE 1

|  | Total N-grams in response to prompt A | Matches with Successfully-Selected Candidate N-grams | Percentage of matched N-grams |
| --- | --- | --- | --- |
| Candidate #1 | 452 | 35 | 7.74% |
| Candidate #2 | 284 | 26 | 9.15% |

It should be understood that the steps discussed in FIGS. 11-22 can be performed for each of the portions of the video interview. As discussed in FIGS. 8-10, the video interview or the audio data of the video interview can be separated into portions. Each portion can relate to a prompt. When comparing the current candidate's N-gram data set to the N-gram database of successfully-selected candidates, the comparison can use portions of the video interviews that are in response to the same prompts. For example, the current candidate's response to prompt A is compared with the successfully-selected candidates' responses to prompt A. This process can be repeated for each of the prompts and the results can be compiled into an N-gram analysis result for the audio data.

Recording Additional Responses to Prompts

As mentioned above in reference to FIG. 9, in some embodiments, the candidate can rerecord all or a portion of the video interview, such as by responding to the same prompts again. The first recording of audio data in response to a prompt can be referred to as an initial portion of the audio data. The second recording can be referred to as a secondary portion of the audio data. The evaluation of the candidate, specifically the N-gram analysis result can include only one portion of audio data in response to a given prompt. As such, only the initial response (initial portion of audio data) or the secondary response (secondary portion of audio data) is maintained for the evaluation of the candidate. In various embodiments, only one of the initial response or the secondary response is selected for the N-gram analysis. In some embodiments, the candidate can choose which recording to keep for his/her analysis.

In some embodiments, both the initial recording and the secondary recording can be analyzed with the N-gram analysis. After the N-gram analysis has been completed for both recordings, the system can save or maintain the portions of the audio data that scored more highly (had a higher percentage of matched N-grams with the successfully-selected candidates) or had a higher similarity value. The similarity value can be equivalent to the percentage of matched N-grams between the current candidate's data and the successfully-selected candidate database. In various embodiments, the system can indicate to the candidate which recording has the highest similarity score.

User Interface (FIGS. 23-25)

Once the evaluation process for the candidates has been completed for each of the candidates, the candidates can be sorted based on their evaluations. FIGS. 23-24 show analysis results and sorting results for a group of candidates at two different times. FIG. 23 can represent time point A. FIG. 24 can represent time point B, which is at some point after time point A. In various embodiments, compiling and weighing the three portions can provide a score. Each candidates' score for each portion can be shown on the user interface. If a candidate has not yet recorded a video interview, he/she can get a zero, such as shown for Ryan Hill and David Thompson in FIG. 23.

The candidates can be organized into a plurality of categories. In an embodiment, the candidates are organized into three categories. In some embodiments, the user interface can include a visual indication showing the assigned category for each candidate.

Comparing FIG. 23 and FIG. 24, it can be seen that Ryan Hill completed his video interview and his overall score increased thereby affecting the sorting of the candidates. Upon completing the video interview, the system can automatically update the score and sorting of the candidate. In other embodiments, the system can automatically update on a set time schedule, such as once a day or once per hour. Further comparing FIG. 23 and FIG. 24, it can be seen that completing the video interview changed the category that Ryan Hill is place in. In FIG. 23, Ryan Hill is in the gray category, and in FIG. 24 Ryan Hill is in the black category. The user interface can be updated in real-time to reflect the current status of a candidate.

The interfaces shown in FIG. 23 and FIG. 24 are an improvement over previous user interfaces that are not based on the methods described above. The previous interfaces do not rank candidate data based on the N-gram analysis over several portions, and therefore fail show the results of these analyses and also fail to provide any knowledge to the viewer of how the individual portions impacted the overall sorting of the candidate data. Furthermore, the previous user interfaces failed to categorize candidate data according to the results of these analyses. As can be seen in these figures, the limitations of previous user interfaces are not found in the interfaces of FIG. 23 and FIG. 24 which clearly sets forth this information in a convenient and easy to understand presentation.

FIG. 25 shows a user interface in accordance with various embodiments herein that has a first, left column portion; a second, center column portion; and a third, right column portion. In some embodiments, in addition to the candidates and their categories, the user interface can include candidate data, criteria data, or notes on the candidate. The user interface provides an improved experience for the user as the candidates can be shown in their sorted order with a visual indication of their sorting based on the N-gram analysis over the several portions. The user interface can also provide additional useful information to the user, such as by displaying portions of the candidate data at the same time as the sorted candidates. In the embodiment shown in FIG. 25, the second portion can show the candidate data for candidate data selected in the first portion, and the third portion can show the criteria data for the open opportunity. In some embodiments, the third portion can provide a visual indication for each item of criteria data and if it is present in the candidate data. In this manner, not only does the user interface of FIG. 25 display the ranked candidate data using the above-described method, but the three portion interface allows a quick review of a ranked candidate data, the ability to select one set of candidate data and see portions of that data, while also viewing the criteria data.

The various user interface embodiments described herein can provide an improved user experience. The user interface can provide a more efficient display of the current candidates and relevant information than the prior interfaces. The improved user interface can also allow a decision maker to more easily recognize which candidates the decision maker would like to follow up with or remove from consideration based on the functionality and presentation of the described interfaces.

Recording Additional Responses

Figure 26:
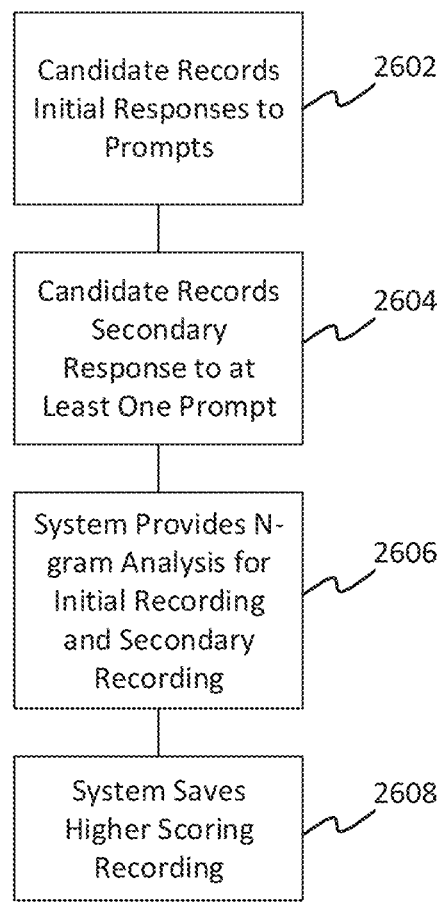
FIG. 26 is a flowchart depicting a method of recording candidate data in accordance with various embodiments herein.

FIG. 26 is a flowchart depicting a method of recording candidate data in accordance with various embodiments herein. The method can include the candidate recording initial responses to the prompts 2602. As discussed above, in some scenarios the candidate may opt to record a secondary response to one or more of the prompts 2604. The system can perform an N-gram analysis, as described herein, on both the initial recording and the secondary recording 2606. The system can save or maintain the recording which scores higher in the N-gram analysis 2608. In other embodiments, the system can make a recommendation to the candidate, such as based on the N-gram analysis. The candidate can affirmatively select which recording to maintain.

Database Structure

Figure 27:
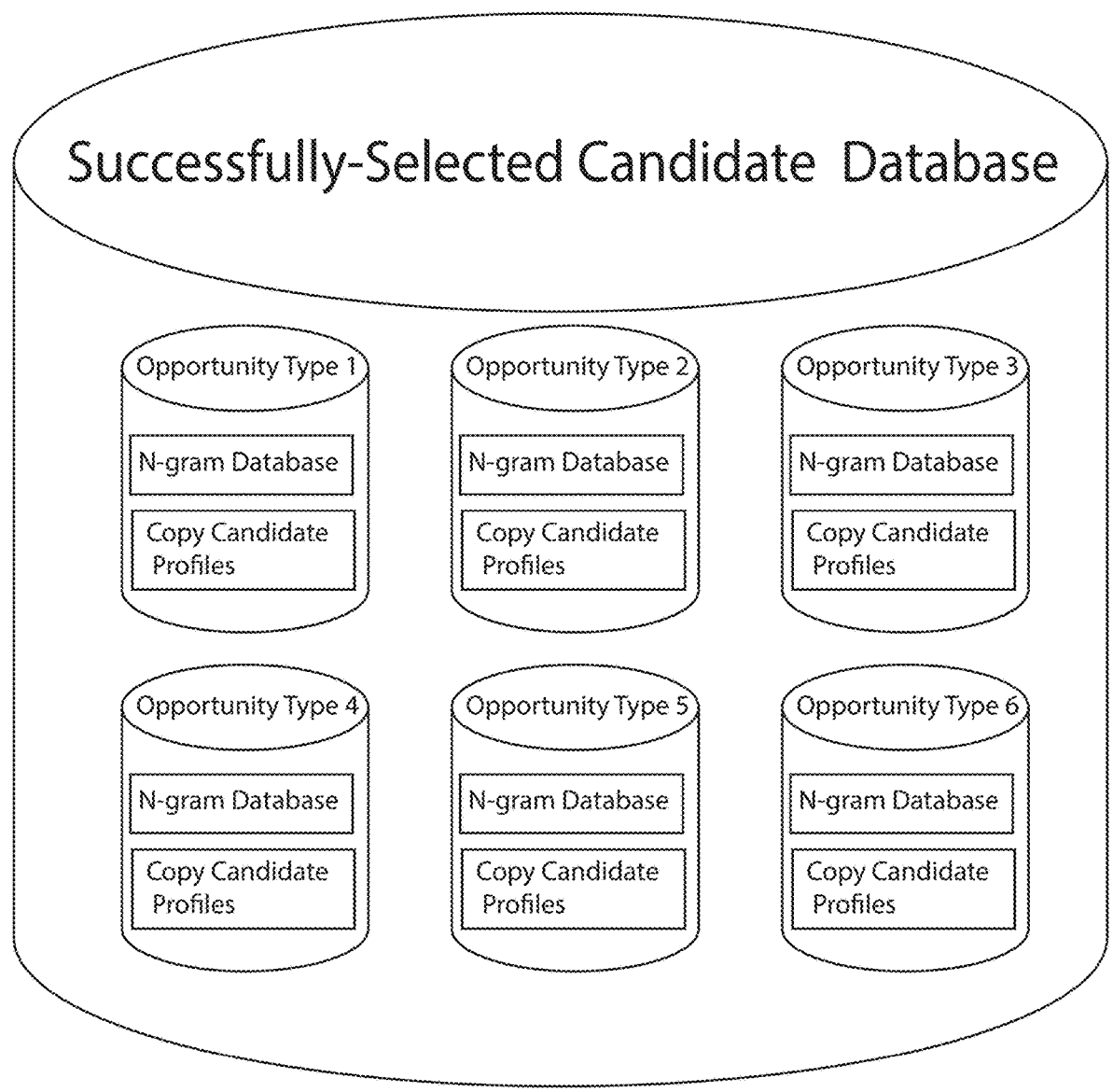
FIG. 27 is a schematic of a database structure in accordance with various embodiments herein.

FIG. 27 is a schematic of a database structure in accordance with various embodiments herein. As previously discussed, a database of previously successfully-selected candidates can be maintained. The database, at a minimum, can include the N-gram data set for each of the prompts that the previously successfully-selected candidate(s) responded to. The N-gram data set for each of the successfully-selected can be stored together and separated into groups, such that each group of N-gram data sets only includes responses to the same prompt. The database can include additional candidate data of the successfully-selected candidates as well, such as a copy of the candidate profile(s).

The database can include groupings of successfully-selected candidates. The groupings can be determined based on the opportunity type that the candidate was selected for. For example, if the current open opportunity is for a nursing position, the database that corresponds with successfully-selected candidates for previous nursing positions can be accessed for the comparison with the current candidates.

In some embodiments, the successfully-selected candidate database can continue to grow as additional candidates are selected for open opportunities. As a result, future potential candidate can have more N-grams to be compared to than previous potential candidates, since each selected candidates' N-grams can be added to the existing database of N-grams.

In some embodiments, the successfully-selected candidate database can be configured to maintain a desired size, such as a desired number of N-grams or a desired number of successfully-selected candidates being in the database. In some embodiments, once the desired number is reached, as additional candidates or candidate data are added to the successfully-selected candidate database other candidates, candidate data, or N-grams can be removed. In some embodiments, the candidates that were selected more recently can be maintained or can replace candidates in the database that have been in the database the longest or were selected (added to the database) the most time ago.

In some embodiments, the successfully-selected candidate data within the successfully-selected candidate database can be weighted. In some embodiments, the most recently successfully-selected candidates can be weighted more heavily than previously selected candidates. In some scenarios, the N-grams of the most recently selected candidates can be more relevant, such as for including more relevant terminology or content, such as to account for societal shifts in language or updates in technology. For example, candidates that were selected in the previous year can have a weight of two, whereas candidates that were selected more than year prior can have a weight of one. If an N-gram within the candidate's N-gram data set matches with an N-gram of a candidate selected within the last year, it can be worth twice as much as matching an N-gram with an N-gram of a candidate that was selected more than one year prior.

In some embodiments, the data within the successfully-selected candidate database can expire or be removed from the database on a candidate-by-candidate basis. In some embodiments, the data within the successfully-selected candidate database can expire or be removed from the database on a prompt-by-prompt basis. In some embodiments, the responses to a first prompt can be maintained for a different time period than the response to a second prompt. For example, the first prompt can be a general question about what a person enjoys about their current job and the second prompt can be a specific questions about a specific technology the candidate prefers to use. The data for the first prompt can remain relevant for a longer period of time. In contrast, the data for the second prompt can become irrelevant quickly as new technology is introduced and utilized. In such an example, the data for the first prompt can be maintained longer than data for the second prompt.

The systems and methods provided herein can be used in a variety of context where various candidates are to be evaluated, sorted, organized, or ranked. For example, the systems and methods described herein could be used in a hiring/employment situation, a school admissions situation, a dating situation, or a political candidate selection process.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A method for sorting data, comprising:
   a. receiving, at a non-transitory computer memory, criteria data from a user regarding an open opportunity, wherein the criteria data comprises:
      i. textual criteria data and
      ii. defined field criteria data, wherein the defined field criteria data comprises:
         first defined field criteria data, and
         second defined field criteria data;
   b. receiving, at the non-transitory computer memory, candidate data, wherein the candidate data comprises:
      i. textual candidate data;
      ii. defined field candidate data, wherein the defined field candidate data comprises:
         first defined field candidate data, and
         second defined field candidate data;
      iii. audio data of the candidate responding to a first prompt, a second prompt and a third prompt, wherein the audio data comprises:
         a first portion audio data of the candidate responding to the first prompt,
         a second portion audio data of the candidate responding to the second prompt, and
         a third portion audio data of the candidate responding to the third prompt;
   c. storing the candidate data in a candidate profile in a candidate database;
   d. evaluating the candidate data, wherein evaluating the candidate data comprises:
      i. comparing the textual criteria data with the textual candidate data to determine a first analysis result for the candidate data;
      ii. comparing the defined field criteria data with the defined field candidate data to determine a defined field analysis result for the candidate data, wherein comparing defined field criteria data with defined field candidate data comprises:
         comparing the first defined field criteria data to the first defined field candidate data, and
         comparing the second defined field criteria data to the second defined field candidate data;
      iii. comparing the audio data of the candidate to a database of successfully-selected candidates to determine an N-gram analysis result for the candidate data, wherein comparing the audio data to the database of successfully-selected candidates comprises:
         creating a first textual transcript of the audio data for the first portion audio data;
         removing stop words from the first textual transcript;
         creating a first N-gram data set of the candidate data based on the first textual transcript with stop words removed;
         comparing the first N-gram data set of the candidate data to a first N-gram data set of the successfully-selected candidates, wherein the first N-gram data set of the successfully-selected candidates is determined by the successfully-selected candidates' responses to the first prompt;
         creating a second textual transcript of the audio data for the second portion audio data;
         removing stop words from the second textual transcript;
         creating a second N-gram data set based on the second textual transcript with stop words removed;
         comparing the second N-gram data set of the candidate data to a second N-gram data set of the successfully-selected candidates, wherein the second N-gram data set of the successfully-selected candidates is determined by the successfully-selected candidates' responses to the second prompt;
         creating a third textual transcript of the audio data for the third portion audio data;
         removing stop words from the third textual transcript;
         creating a third N-gram data set based on the third textual transcript with stop words removed;
         comparing the third N-gram data set of the candidate data to a third N-gram data set of the successfully-selected candidates, wherein the third N-gram data set of the successfully-selected candidates is determined by the successfully-selected candidates' responses to the third prompt;
         compiling the comparison of the first N-gram data set, the comparison of the second N-gram data set, and the comparison of the third N-gram data set to determine the N-gram analysis result for the audio data;
      iv. compiling the first analysis result, the direct field analysis result and the N-gram analysis result into an overall analysis result;
   e. sorting the candidate data within a plurality of other candidate data using the overall analysis result.

2. The method of claim 1, further comprising: displaying the sorted candidate data on a user interface to the user.

3. The method of claim 1, further comprising sorting the candidate data into one of three groups based on the overall analysis result.

4. The method of claim 1, wherein the first analysis results for the candidate data further comprises a distance analysis between geographical data in the criteria data and geographical data in the textual candidate data.

5. The method of claim 1, wherein the candidate data further comprises video data of the candidate responding to the first prompt, the second prompt, and the third prompt, wherein the video data is recorded simultaneously with the audio data.

6. The method of claim 1, wherein the second portion audio data or the third portion audio data was recorded prior to the first portion audio data.

7. The method of claim 1, further comprising removing low-value words from the first N-gram data set, the second N-gram data set, and the third N-gram data set, wherein after removing low-value words from the first N-gram data set, the second N-gram data set and the third N-gram data set, only nouns, adjectives, verbs, and adverbs remain in the first N-gram data set, the second N-gram data set, and the third N-gram data set.

8. The method of claim 1, wherein compiling the first analysis result, the direct field analysis result, and the N-gram analysis results comprises weighting the first analysis result more than the direct field analysis result and the N-gram analysis result.

9. The method of claim 8, wherein compiling the first analysis result, the direct field analysis result, and the N-gram analysis results comprises weighting the direct field analysis result more than the N-gram analysis result.

10. The method of claim 1, wherein the candidate data comprises an initial first portion audio data and a secondary first portion audio data, wherein both the initial first portion audio data and the secondary first portion audio data are of the candidate responding to the first prompt.

11. The method of claim 10, further comprising selecting one of the initial first portion audio data or the secondary first portion audio data for creating the first textual transcript.

12. The method of claim 10, wherein comparing the first N-gram data set of the candidate data to a first N-gram data set of the successfully-selected candidates comprises:
   comparing a first N-gram data set of the initial first portion audio data with the first N-gram data set of the successfully-selected candidates and comparing a first N-gram data set of the secondary first portion audio data with the first N-gram data set of the successfully-selected candidates.

13. The method of claim 12, wherein compiling the comparison of the first N-gram data set, the comparison of the second N-gram data set, and the comparison of the third N-gram data set to determine the N-gram analysis result for the audio data comprises:
   determining a similarity value of the comparison of the first N-gram data set of the initial first portion audio data with the first N-gram data set of the successfully-selected candidates and determining a similarity value of the first N-gram data set of the secondary first portion audio data with the first N-gram data set of the successfully-selected candidates.

14. The method of claim 13, further comprising:
   maintaining the initial first portion audio data for the N-gram analysis result when the similarity value of the first N-gram data set of the initial first portion audio data with the first N-gram data set of the successfully-selected candidate is greater than the similarity value of the first N-gram data set of the secondary first portion audio data with the first N-gram data set of the successfully-selected candidate, or
   maintaining the secondary first portion audio data for the N-gram analysis result when the similarity value of the first N-gram data set of the secondary first portion audio data with the first N-gram data set of the successfully-selected candidate is greater than the similarity value of the first N-gram data set of the initial first portion audio data with the first N-gram data set of the successfully-selected candidate; and
   wherein the maintained first portion audio data is incorporated into the compilation of the first analysis result, the direct field analysis result and the N-gram analysis result into the overall analysis result.

15. A method for sorting data, comprising:
   a. receiving, at a non-transitory computer memory, criteria data from a user regarding an open opportunity;
   b. receiving, at the non-transitory computer memory, candidate data, wherein the candidate data comprises audio data of the candidate responding to a first prompt, a second prompt and a third prompt, wherein the audio data comprises:
      i. a first portion audio data of the candidate responding to the first prompt,
      ii. a second portion audio data of the candidate responding to the second prompt, and
      iii. a third portion audio data of the candidate responding to the third prompt;
   c. storing candidate data in a candidate profile in a candidate database;
   d. evaluating the candidate data, wherein evaluating the candidate data comprises:
      i. comparing the audio data of the candidate to a database of successfully-selected candidates to determine an N-gram analysis result for the candidate data, wherein comparing the audio data to the database of successfully-selected candidates comprises:
         creating a first textual transcript of the audio data for the first portion audio data;
         removing stop words from the first textual transcript;
         creating a first N-gram data set based on the first textual transcript with stop words removed;
         comparing the first N-gram data set of the candidate data to a first N-gram data set of the successfully-selected candidates, wherein the first N-gram data set of the successfully-selected candidates is determined by the successfully-selected candidates' responses to the first prompt;
         creating a second textual transcript of the audio data for the second portion audio data;
         removing stop words from the second textual transcript;
         creating a second N-gram data set based on the second textual transcript with stop words removed;
         comparing the second N-gram data set of the candidate data to a second N-gram data set of the successfully-selected candidates, wherein the second N-gram data set of the successfully-selected candidates is determined by the successfully-selected candidates' responses to the second prompt;
         creating a third textual transcript of the audio data for the third portion audio data;
         removing stop words from the third textual transcript;
         creating a third N-gram data set based on the third textual transcript with stop words removed;
         comparing the third N-gram data set of the candidate data to a third N-gram data set of the successfully-selected candidates, wherein the third N-gram data set of the successfully-selected candidates is determined by the successfully-selected candidates' responses to the third prompt;
         compiling the comparison of the first N-gram data set, the comparison of the second N-gram data set, and the comparison of the third N-gram data set to determine the N-gram analysis result for the audio data;
   e. sorting the candidate data within a plurality of other candidate data using the N-gram analysis result.

16. The method of claim 15, wherein the candidate data comprises an initial first portion audio data and a secondary first portion audio data, wherein both the initial first portion audio data and the secondary first portion audio data are of the candidate responding to the first prompt.

17. The method of claim 16, wherein comparing the first N-gram data set of the candidate data to a first N-gram data set of the successfully-selected candidates comprises:
   comparing a first N-gram data set of the initial first portion audio data with the first N-gram data set of the successfully-selected candidates and comparing a first N-gram data set of the secondary first portion audio data with the first N-gram data set of the successfully-selected candidates.

18. The method of claim 17, wherein compiling the comparison of the first N-gram data set, the comparison of the second N-gram data set, and the comparison of the third N-gram data set to determine the N-gram analysis result for the audio data comprises:

determining a similarity value of the comparison of the first N-gram data set of the initial first portion audio data with the first N-gram data set of the successfully-selected candidates and determining a similarity value of the first N-gram data set of the secondary first portion audio data with the first N-gram data set of the successfully-selected candidates, maintaining the initial first portion audio data for the N-gram analysis result when the similarity value of the first N-gram data set of the initial first portion audio data with the first N-gram data set of the successfully-selected candidate is greater than the similarity value of the first N-gram data set of the secondary first portion audio data with the first N-gram data set of the successfully-selected candidate, or maintaining the secondary first portion audio data for the N-gram analysis result when the similarity value of the first N-gram data set of the secondary first portion audio data with the first N-gram data set of the successfully-selected candidate is greater than the similarity value of the first N-gram data set of the initial first portion audio data with the first N-gram data set of the successfully-selected candidate; and wherein the maintained first portion audio data is incorporated into the compilation of the first analysis result, the direct field analysis result and the N-gram analysis result into the overall analysis result.

19. A method of populating a successfully-selected candidate database for a first type of open opportunity, comprising:

a. receiving, at a non-transitory computer memory, criteria data from a user regarding an open opportunity of the first type;
  b. receiving, at the non-transitory computer memory, first candidate data, wherein the first candidate data comprises audio data of a first candidate responding to a first prompt, a second prompt and a third prompt, wherein the audio data comprises:
    i. a first portion audio data of the first candidate responding to the first prompt,
    ii. a second portion audio data of the first candidate responding to the second prompt, and
    iii. a third portion audio data of the first candidate responding to the third prompt;
  c. storing first candidate data in a first candidate profile in a candidate database;
  d. receiving an indication that the first candidate was selected for the open opportunity;
  e. saving the first candidate data in a successfully-selected candidate database for open opportunities of the first type, wherein the first candidate data comprises:
    i. a first N-gram data set; wherein the first N-gram data set is created by:
      creating a first textual transcript of the audio data for the first portion audio data;
      removing stop words from the first textual transcript; and
      forming a plurality of N-grams based on the first textual transcript with stop words removed, wherein the first N-gram data set comprises the plurality of N-grams;
    ii. a second N-gram data set; wherein the second N-gram data set is created by:
      creating a second textual transcript of the audio data for the second portion audio data;
      removing stop words from the second textual transcript; and
      forming a plurality of N-grams based on the first textual transcript with stop words removed, wherein the first N-gram data set comprises the plurality of N-grams;
    iii. a third N-gram data set; wherein the third N-gram data set is created by:
      creating a third textual transcript of the audio data for the third portion audio data;
      removing stop words from the third textual transcript; and
      forming a plurality of N-grams based on the third textual transcript with stop words removed, wherein the third N-gram data set comprises the plurality of N-grams.

20. The method of claim 19, further comprising:

a. receiving, at a non-transitory computer memory, criteria data from a second user regarding a second open opportunity of the first type;
  b. receiving, at the non-transitory computer memory, second candidate data, wherein the second candidate data comprises audio data of a second
  candidate responding to the first prompt, the second prompt and the third prompt, wherein the audio data comprises:
    i. a first portion audio data of the second candidate responding to the first prompt,
    ii. a second portion audio data of the second candidate responding to the second prompt, and
    iii. a third portion audio data of the second candidate responding to the third prompt;
  c. storing second candidate data in a second candidate profile in the candidate database;
  d. receiving an indication that the second candidate was selected for the second open opportunity;
  e. saving the second candidate data in the successfully-selected candidate database for open opportunities of the first type, wherein the second candidate data comprises:
    i. a first N-gram data set; wherein the first N-gram data set is created by:
      creating a first textual transcript of the audio data for the first portion audio data;
      removing stop words from the first textual transcript; and
      forming a plurality of N-grams based on the first textual transcript with stop words removed, wherein the first N-gram data set comprises the plurality of N-grams;
    ii. a second N-gram data set; wherein the second N-gram data set is created by:
      creating a second textual transcript of the audio data for the second portion audio data;
      removing stop words from the second textual transcript; and
      forming a plurality of N-grams based on the first textual transcript with stop words removed, wherein the first N-gram data set comprises the plurality of N-grams;

iii. a third N-gram data set; wherein the third N-gram data set is created by:
   creating a third textual transcript of the audio data for the third portion audio data;
   removing stop words from the third textual transcript; and
   forming a plurality of N-grams based on the third textual transcript with stop words removed, wherein the third N-gram data set comprises the plurality of N-grams.

\* \* \* \* \*